United States Patent [19]
Piot et al.

[11] Patent Number: 6,031,218
[45] Date of Patent: Feb. 29, 2000

[54] SYSTEM AND METHOD FOR GENERATING BAND-LIMITED QUASI-SINUSOIDAL SIGNALS

[75] Inventors: Julien Piot, Rolle; René Dändliker, Corcelles; Marc Bidiville, Pully, all of Switzerland

[73] Assignee: Logitech, Inc., Fremont, Calif.

[21] Appl. No.: 09/265,024

[22] Filed: Mar. 8, 1999

Related U.S. Application Data

[63] Continuation-in-part of application No. 09/039,164, Mar. 13, 1998, which is a continuation of application No. 08/478,191, Jun. 7, 1995, Pat. No. 5,729,009, which is a continuation-in-part of application No. 08/424,125, Apr. 19, 1995, Pat. No. 5,703,356, which is a continuation of application No. 08/199,982, Feb. 18, 1994, abandoned, which is a continuation of application No. 07/956,907, Oct. 5, 1992, Pat. No. 5,288,993.

[51] Int. Cl.$^7$ .............................. H01J 40/14; G01V 9/04
[52] U.S. Cl. ................................. 250/208.2; 250/214 R; 250/221; 250/231.13; 345/158
[58] Field of Search ........................... 250/208.2, 214 R, 250/221, 231.13, 208.1, 208.5, 214.1, 215, 222.1, 229, 231.12, 231.14, 231.16, 231.18; 345/163, 164, 165, 166, 167, 179, 156, 157; 341/13, 14, 31, 6, 5, 20, 22

[56] References Cited

U.S. PATENT DOCUMENTS

| | | | |
|---|---|---|---|
| 4,546,347 | 10/1985 | Kirsch | 345/166 |
| 4,698,626 | 10/1987 | Sato et al. | 345/166 |
| 4,720,631 | 1/1988 | Lapeyre | 250/231.18 |
| 4,751,380 | 6/1988 | Victor et al. | 250/221 |
| 4,794,384 | 12/1988 | Jackson | 345/166 |
| 4,799,055 | 1/1989 | Nestler et al. | 345/166 |
| 4,920,260 | 4/1990 | Victor et al. | 250/221 |
| 5,015,070 | 5/1991 | Montgomery et al. | 250/221 |
| 5,027,115 | 6/1991 | Sato et al. | 341/13 |
| 5,288,993 | 2/1994 | Bidiville et al. | 250/221 |
| 5,298,919 | 3/1994 | Chang | 345/163 |
| 5,347,275 | 9/1994 | Lau | 341/20 |
| 5,391,868 | 2/1995 | Vampola et al. | 250/208.1 |
| 5,703,356 | 12/1997 | Bidiville et al. | 250/221 |
| 5,729,009 | 3/1998 | Dändliker et al. | 250/208.2 |

*Primary Examiner*—John R. Lee
*Attorney, Agent, or Firm*—Fenwick & West LLP

[57] ABSTRACT

A method for generating quasi-sinusoidal signals includes illuminating an object capable of reflecting light, focusing a portion of the reflected light on a multi-element detector to form an image, and matching the image size to the size of the detector elements. A first weighted sum of signals generated by a first set of elements produces an in-phase signal, and a second weighted sum of signals generated by a second set of elements produces a quadrature signal. Weights are signed quantities selected to exhibit a band-pass behavior in the spatial frequency domain, thereby attenuating noise generated by, for example, non-uniform surface reflectance and non-uniform illumination.

11 Claims, 18 Drawing Sheets

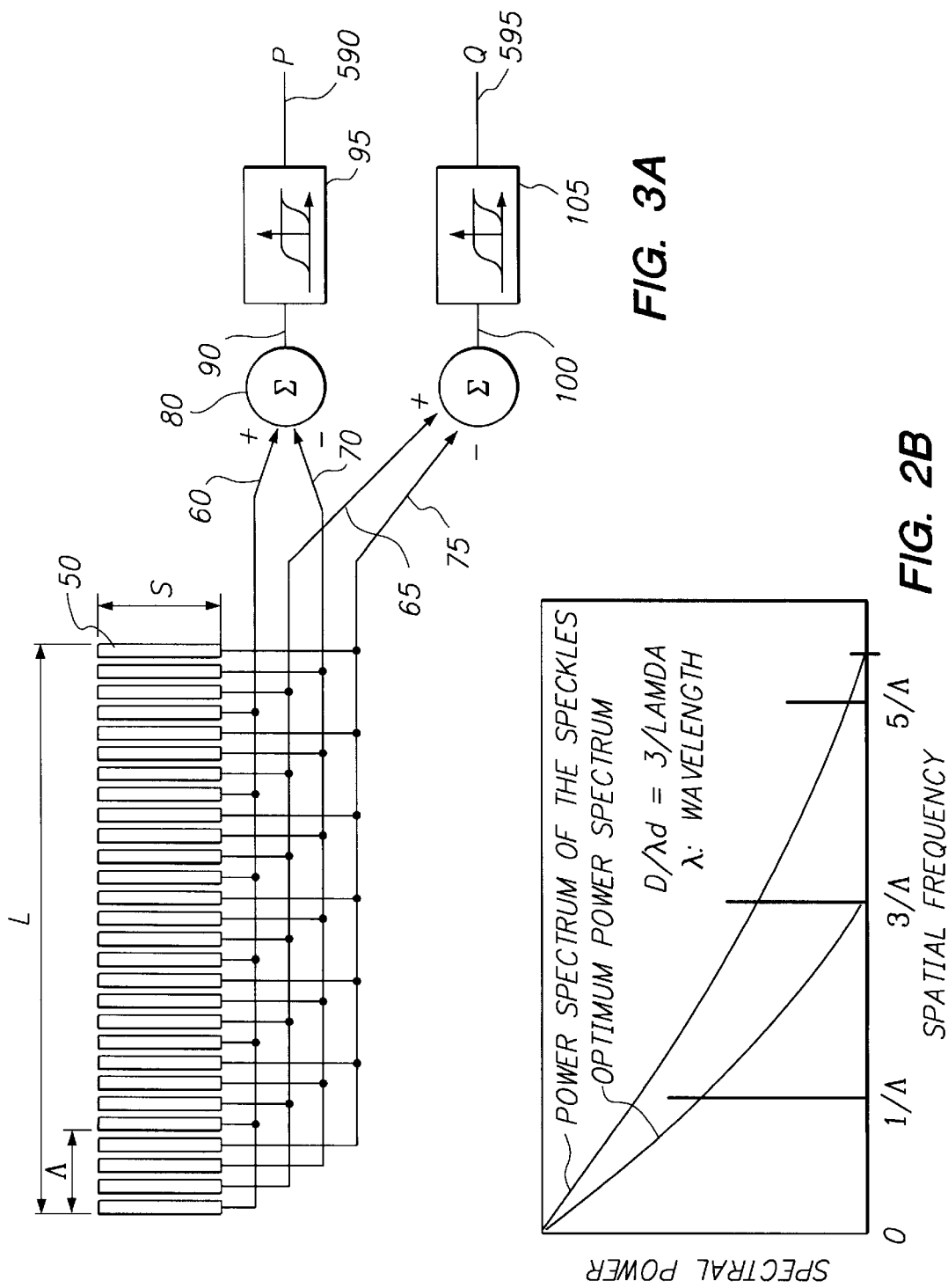

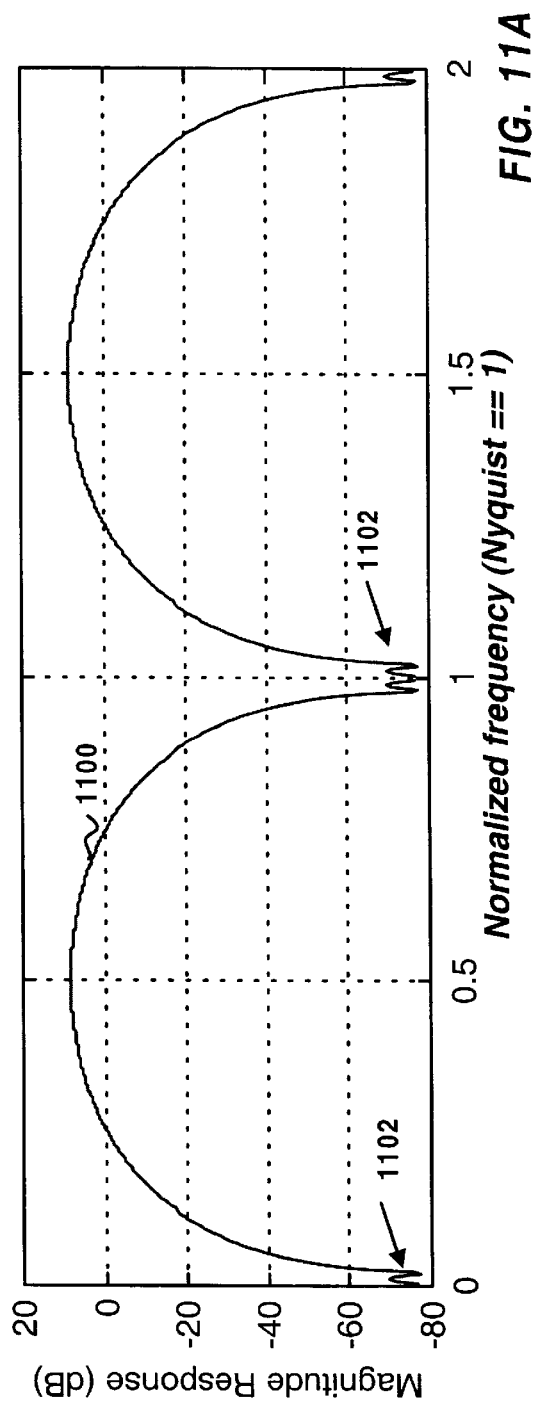
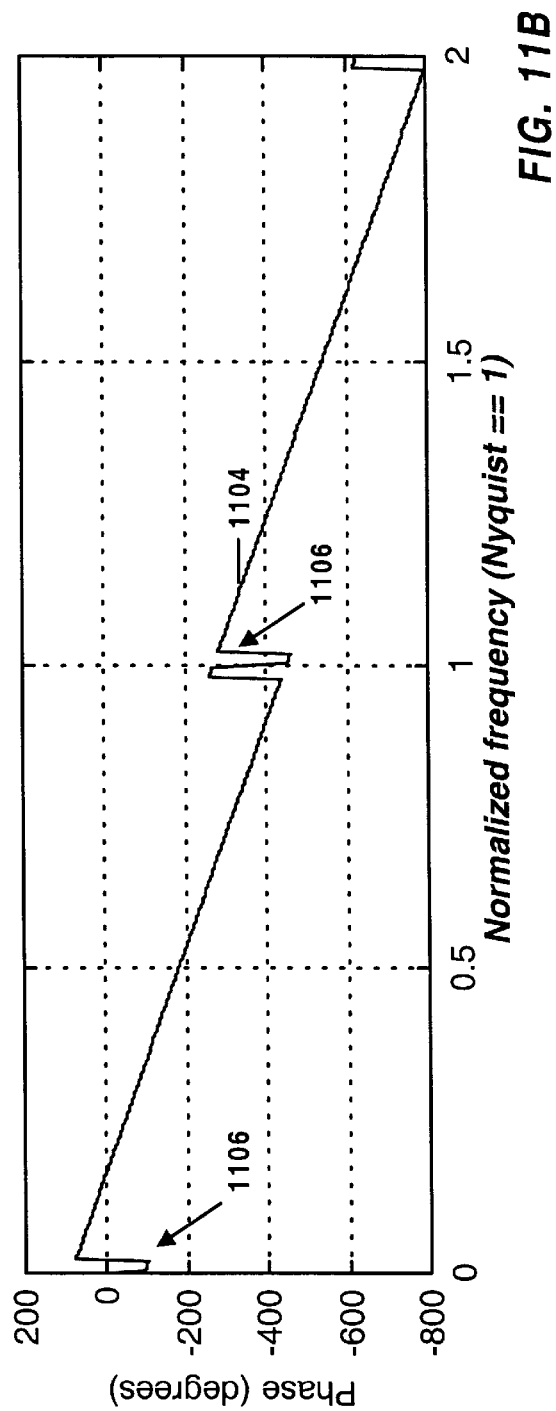
FIG. 11A
FIG. 11B

SYSTEM AND METHOD FOR GENERATING BAND-LIMITED QUASI-SINUSOIDAL SIGNALS

RELATED APPLICATIONS

This application is a continuation-in-part of U.S. patent application Ser. No. 09/039,164, filed Mar. 13, 1998, which is a continuation of U.S. patent application Ser. No. 08/478, 191, filed on Jun. 7, 1995, and now U.S. Pat. No. 5,729,009, which is a continuation-in-part of U.S. patent application Ser. No. 08/424,125, filed Apr. 19, 1995, and now U.S. Pat. No. 5,703,356, which is a continuation of U.S. patent application Ser. No. 08/199,982, filed Feb. 18, 1994, now abandoned, which is a continuation of U.S. patent application Ser. No. 07/956,907, filed Oct. 5, 1992, and now U.S. Pat. No. 5,288,993. The co-pending U.S. patent application Ser. No. 09/039,164, filed Mar. 13, 1998, is commonly assigned with the present invention, and is incorporated by reference herein in its entirety.

FIELD OF THE INVENTION

The present invention relates to optical pointing devices for use with personal computers, workstations and other computing devices, and more particularly relates to optical pointing devices having no mechanically moving parts and which operate without the need for a specially patterned surface.

BACKGROUND OF THE INVENTION

Pointing devices, such as mice and trackballs, are well known peripherals for personal computers and workstations. Such pointing devices allow rapid relocation of the cursor on a display screen, and are useful in many text, database and graphical programs. Perhaps the most common form of pointing device is the electronic mouse; the second most common may well be the trackball.

With a mouse, the user controls the cursor by moving the mouse over a reference surface; the cursor moves a direction and distance proportional to the movement of the mouse. Although some electronic mice use reflectance of light over a reference pad, and others use a mechanical approach, most prior art mice use a ball which is on the underside of the mouse and rolls over the reference surface (such as a desktop) when the mouse is moved. In such a device, the ball contacts a pair of shaft encoders and the rotation of the ball rotates the shaft encoders, which historically includes an encoding wheel having a plurality of slits therein. A light source, often an LED, is positioned on one side of the encoding wheel, while a photosensor, such as a phototransistor, is positioned substantially opposite the light source. Rotation of the encoding wheel therebetween causes a series of light pulses to be received by the photosensor, by which the rotational movement of the ball can be converted to a digital representation useable to move the cursor.

Although such an approach has worked well for some time, with high quality mice and trackballs providing years of trouble-free use, the mechanical elements of such pointing devices necessarily limit the useful life of the device.

Conventional optical mice which illuminate a reference pad, while having few or no mechanical parts, have historically been limited due to the need for the reference pad to have a regular pattern, as well as many other limitations.

While conventional optical mice have typically required a reference pad, two methods are known in the general optical art for detecting movement of a scattering surface illuminated by coherent illumination. The first such approach employs illumination of the surface with two light sources and using a single detector; the second includes illumination with only a single beam but using a grating filter in front of a single detector. In both these cases, forward and backward movement cannot be distinguished, in what is referred to as sign ambiguity. Likewise, in both cases the detection is sensitive to one direction of movement in the plane. Further, in the case of the first approach, the two illuminating beams have to be rotated to be sensitive to another direction of movement; that is, for each direction of movement an independent detection system of illuminating beams and detector has to be used. In the case of the second approach, the grating filter in front of the detector has to be rotated to be sensitive to another direction of movement.

The subject matter of co-pending U.S. patent application Ser. No. 09/039,164, filed Mar. 13, 1998, entitled "Method For Generating Quasi-sinusoidal Signals," overcomes substantially all of the foregoing limitations identified above, and provides an improved system and method for optical detection of motion of a detector relative to an irregularly speckled or patterned surface. The optical detection is accomplished by detecting zero voltage crossings of quasi-sinusoidal signals generated by detectors in response to, for example, an optical mouse being moved over a reflective surface.

Under certain conditions, the quasi-sinusoidal signals can be corrupted by noise from, for example, non-uniform beam illumination or non-uniform surface reflectance. Non-uniform illumination occurs if the reflective surface is illuminated by a light source having a non-uniform distribution, i.e., the light intensity measured across the illumination spot is not constant. Non-uniform surface reflectance occurs if a detector is moved along a non-uniform surface, such as a printed pattern or textured desk surface. For example, noise can be generated by moving the detector over a surface having black letters on a white surface, such as found on the page of a book. The noise manifests itself as a time varying low frequency offset to the quasi-sinusoidal signals, which prevents the accurate detection and counting of zero crossings. The use of zero crossings to determine cursor displacements is described in detail in U.S. Pat. No. 5,729,009, which is incorporated by reference herein in its entirety.

Although using a reference pad with a uniform pattern may reduce noise from non-uniform surface reflection, there are many applications where the reference pad may be too burdensome or inconvenient to use. For example, computer users often work in environments where there are no flat surfaces to place the reference pad on, such as airplanes or cars. Moreover, many computer retailers prefer to place their logos or brand names on reference pads for promotional purposes. These logos or brand names, in essence, generate non-uniform surface reflectance.

Accordingly, there is a need for a system and method for generating band-limited quasi-sinusoidal signals for use in, for example, an optical mouse, to enable the user to move the mouse over almost any surface, including those surfaces having printed material or texture. Such a system and method should not add significant hardware or manufacturing costs to existing optical mouse designs. Nor should such a system and method significantly impact the size or weight of existing optical mouse designs.

SUMMARY OF THE INVENTION

The present invention is directed to a system and method for generating band-limited quasi-sinusoidal signals. A method of generating band-limited quasi-sinusoidal signals comprises the steps of: illuminating an object with light; focusing the light reflected from the object onto a detector to form an image. The detector has a plurality of detector elements for generating output signals in response to the image being detected; the image size is optically matched to the detector element size. Filtering the output signals to attenuate spatial frequencies outside a predetermined spatial frequency band; and combining the output signals to provide band-limited quasi-sinusoidal signals.

A system for generating band-limited quasi-sinusoidal signals comprises a light source for transmitting light toward a surface of an object that reflects light; an aperture having an opening for receiving the reflected light; a lens for focusing the reflected light to form an image; and a detector, optically matched with the aperture and the lens, for receiving the image. The detector has a plurality of detector elements for detecting the image and generating output signals in response to the detection of the image. The output signals are weighted to attenuate spatial frequencies outside a predetermined spatial frequency band. The weighted output signals are then combined to form quasi-sinusoidal signals.

In a preferred embodiment of the present invention, weighting parameters are applied to output signals generated by detector elements in a detector array. The weighting parameters are selected to provide attenuation of spatial frequencies within a predetermined spatial frequency band. The weighting parameters can be implemented in digital, analog, or charge domains.

In the digital domain, measured voltages indicative of light intensity in the image plane of a multi-element detector are converted into digital representations by, for example, an analog-to-digital ("A/D") converter. The digitized output are weighted and added using a finite impulse response filter ("FIR"). The FIR filter can be implemented using dedicated hardware, or a digital signal processor ("DSP").

In the analog domain, measured voltages indicative of the light intensity in the image plane of a sensor are weighted and added using a resistor network configuration, or preferably a switch capacitor weighted-sum structure for providing increased weight precision.

In the charge domain, a fraction of photocharge generated in response to photons impinging one or more detector elements is effectively "dumped," before being summed and converted into a measured voltage. The fraction of photocharge selected for "dumping" is determined by a set of weighting parameters.

In all three cases described above, the weighting parameters are determined using spatial filter design techniques.

These and other objects of the present invention may be better appreciated from the following Detailed Description of the Invention, taken in combination with the accompanying Figures.

BRIEF DESCRIPTION OF THE DRAWINGS

FIG. 2B shows a plot of spatial frequency versus spectral power for the comb detector of FIG. 2A in accordance with the present invention.

FIG. 3A shows, in simplified schematic block diagram form, the use of the comb detector of FIG. 2A as a detector for sensing motion in one dimension in accordance with the present invention.

FIGS. 11A and 11B are plots of the frequency response of the sparse strip detector shown in FIG. 10 in accordance with the present invention.

DETAILED DESCRIPTION OF THE INVENTION

Figure 1:
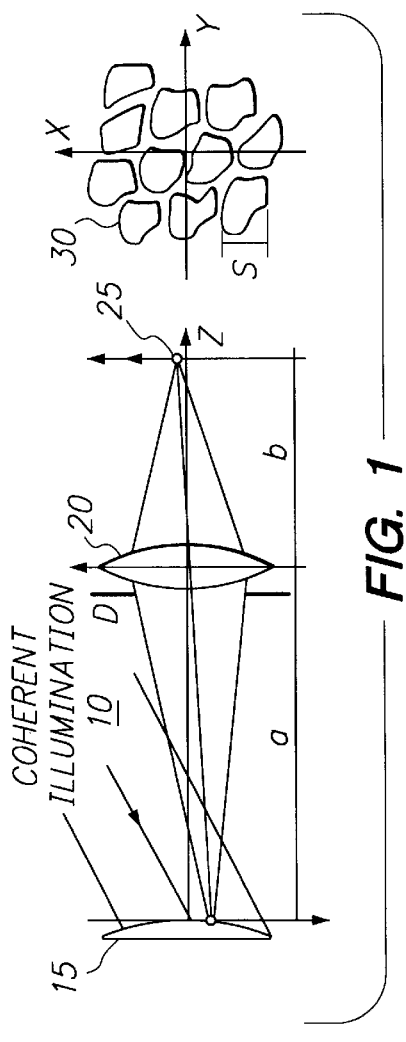
FIG. 1 shows, in simplified form, an optical system in accordance with the present invention.

Referring to FIG. 1, an optical system according to the present invention is shown in simplified form. In a presently preferred embodiment, a coherent light source 10, such as a laser diode or similar device, illuminates a surface 15 with coherent light. The surface, which may be the surface of a desk or a piece of conventional paper diffusely scatters light, some of which passes through an aperture D and thence through a lens 20. The light is focused by the lens 20 onto a sensor 25, where a speckled image 30 is formed. The image 30 comprises a series of spots on a contrasting background, such as dark spots on a light background, essentially of the same type as described in U.S. Pat. No. 5,703,356, noted above. The distance from the surface 15 to the lens 20 is indicated by the dimension "a", while the distance from the lens to the detector 25 is indicated by the dimension "b". In this arrangement, the average speckle size "s" is determined by the wavelength $\lambda$, the lens aperture D and the image distance "b" through the relation $s \approx \lambda b/D$. More particularly, in an exemplary embodiment the value of "a" varies between 5 mm to 20 mm, while the value of "b" varies between 5 mm and 20 mm, the value of D varies between 0.2 mm and 2 mm, while the value of "s" varies between 10 $\mu$m and 100 $\mu$m and the value of $\lambda$ varies between 600 nm and 990 nm.

In an alternative embodiment of the device shown in FIG. 1, a coherent light source 10 is not required, and a patterned or speckled surface is used to create the speckled image 30 on the sensor 25. The sensor 25 is described in greater detail in FIG. 2A.

Figure 2A:
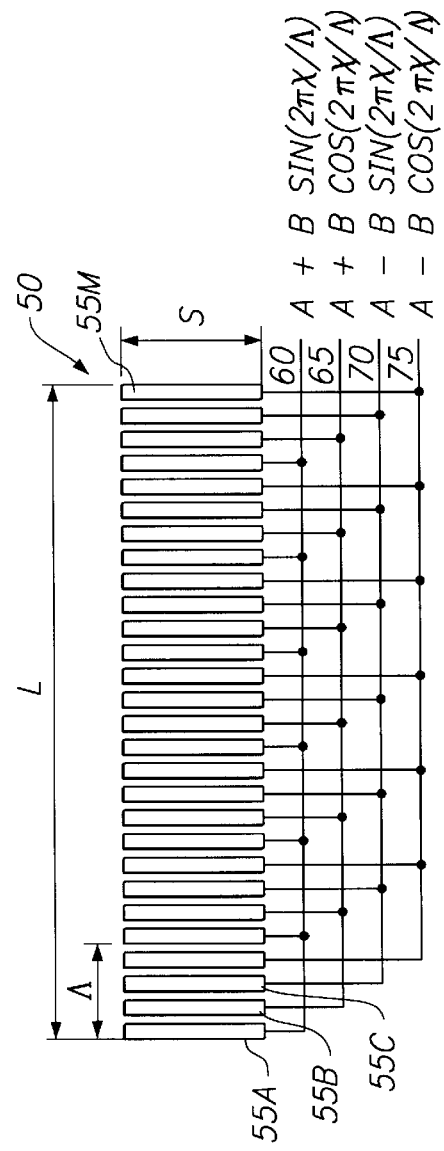
FIG. 2A shows a comb detector design in accordance with the present invention.

Referring next to FIG. 2A, a comb array detector 50 which is a significant feature of the present invention is shown. In particular, the comb array detector 50 comprises an array of detector elements 55A–55M arranged so that the output of every fourth element is connected together, forming what is essentially a quadruple array. The array may have an overall length L, a height S, and a distance $\Lambda$ from the first to the fourth element, essentially forming the period of the array. For an exemplary embodiment, typical values of $\Lambda$ vary between 20 $\mu$m and 100 $\mu$m, while the value of L varies between 0.2 mm and 5 mm, and the value of S varies between 0.1 mm and 1 mm.

The output 60 of the first group of elements may be represented as A+B sin $(2\pi x/\Lambda)$, while the output 65 of the second group can be represented as A+B cos $(2\pi x/\Lambda)$, while the output 70 of the third group can be represented as A–B sin $(2\pi x/\Lambda)$, and the output 75 of the fourth group can be represented as A–B cos $(2\pi x/\Lambda)$. The spectral and statistical properties of the detector signal depend on the size "s" of the speckles compared with the geometrical dimensions of the detector array. The comb array detector 50 acts as a spatial frequency filter where the filter characteristic for the differential detector signal [A+B sin $(2\pi x/\Lambda)$]–[A+B sin $(2\pi x/\Lambda)$]=2B sin $(2\pi x/\Lambda)$ is shown in FIG. 2B. It can be seen to consist of peaks at the odd (1st, 3rd, 5th, . . . ) orders of the spatial frequency 1/$\Lambda$ corresponding to the period $\Lambda$ of the array detector 50. The power spectrum of the spatial distribution of the intensity in the speckle pattern is given by the autocorrelation function of the lens aperture D, which is shown in FIG. 2B for a circular aperture, and the image distance "b". The correlation is lost for movements in both the x and y directions when an entirely new set of speckles appears within the detector area.

The sinusoidal properties of the differential detector signal [A+B sin $(2\pi x/\Lambda)$]–[A+B sin $(2\pi x/\Lambda)$]=2B sin $(2\pi x/\Lambda)$ are obtained through optical matching which is one of the significant features of the present invention. Optical matching is achieved when the power spectrum of the spatial distribution of the intensity in the speckle pattern has no power at spatial frequencies equal to the odd multiples of the spatial frequency 1/$\Lambda$, except at frequency 1/$\Lambda$. Since the power spectrum of the speckle pattern has no energy at frequencies above D/$\lambda$b, optical matching is achieved when D/$\lambda$b<3/$\Lambda$, typically by choosing the aperture D=3b$\lambda$/$\Lambda$.

The operation of the array detector 50 to generate quasi-sinusoidal signals may be better appreciated from FIG. 3A. The detector array 50 is again shown as having four current outputs as in FIG. 2A. In this instance, the first output 60 is shown connected to the positive input of a current summing circuit 80, while the third output 70 is shown connected to the inverting or negative input to the summing circuit 80. Similarly, the second output 65 is connected to the positive input of a current summing circuit 85, while the fourth output 75 is connected to the negative or inverting input to the summing circuit 85.

The output 90 of summing circuit 80 is provided to a current comparator 95, while the output 100 of the summing circuit 85 is provided to a current comparator 105. The current comparators 95 and 105 each have a symmetrical hysteresis around zero and a voltage output of 0 V or 5 V. The output of the comparator 95 is the in-phase signal P, while the output of the comparator 105 is the quadrature signal Q.

The signals 90 and 100 represent the differential current outputs of the various phases of the detector array 50. At any time, the current is the response of the sensor to the optically filtered speckle pattern. When the pattern is moving at velocity "v" with respect to the sensor, a sinewave-like signal is generated at a temporal frequency (in hertz) of v/$\Lambda$. A characteristic waveform is shown in FIG. 3B. As a result, an estimate of the displacement may be obtained by counting the number of periods the signal achieves during displacement. The quasi-sinewave nature of the signal shown in FIG. 3B is due to the optical matching discussed above which reduces the number of frequency lines to a single line.

It is presently believed that the best results are given when the length L of the array is chosen so that the quasi-sinusoidal signal has a correlation length of several periods, for example L>5$\Lambda$, and in an exemplary embodiment may have L=25$\Lambda$. The width or height S of the detector array 50 is chosen so that the correlation of the quasi-sinusoidal signal is not reduced too much by a transverse displacement component; i.e., typically S/L>0.1. Finally, the size of the illuminated spot on the surface 15 is chosen so that its image corresponds best to the detector array size in the image.

The purpose of the comparators 95 and 105 is to generate digital signals from the sinewave-like signals shown in FIG. 3B, which facilitates interfacing the output signals P and Q to digital counters for measurement of a period count.

Figure 3C:
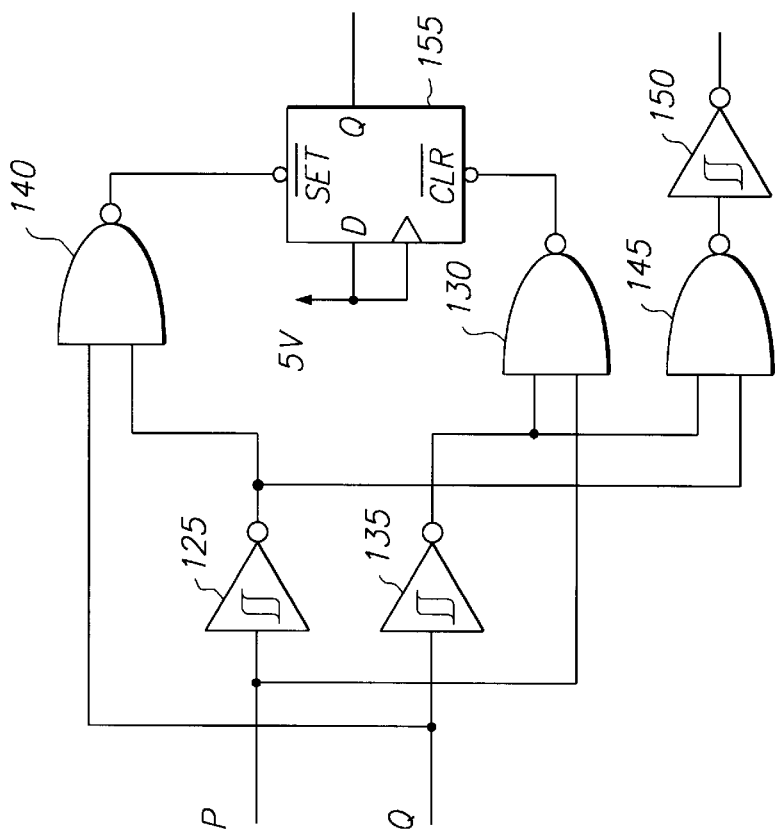
FIG. 3C shows a quadrature encoder suitable for use with the circuit of FIG. 3A in accordance with the present invention.
Figure 3B:
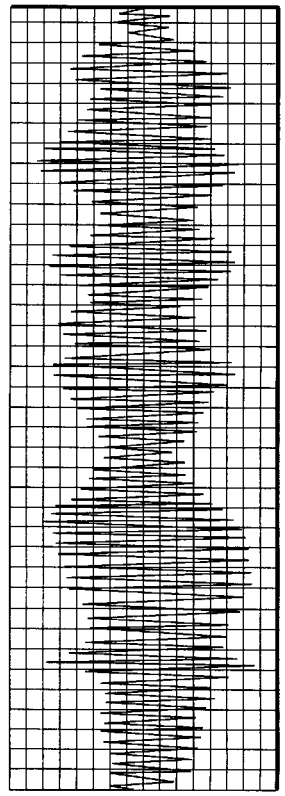
FIG. 3B shows a typical waveform produced at each of the summing points of the circuit of FIG. 3A in accordance with the present invention.

The in-phase and quadrature signals (P and Q) may be combined, as shown in FIG. 3C. More specifically, the signal P is provided to the input of a first Schmitt trigger 125 and also to one input of a NAND gate 130. The signal Q is provided to the input of a second Schmitt trigger 135 and also to one input of a NAND gate 140. The output of the Schmitt trigger 125 provides the second input to the NAND gate 140 and also provides a first input to another NAND gate 145. The output of the Schmitt trigger 135 provides the second input to the NAND gate 130 and also provides the second input to the NAND gate 145. The output of the NAND gate 145 provides the input to a third Schmitt trigger 150, the output of which is a COUNT signal. The output of the NAND gate 130 provides an inverted CLEAR signal to a D flipflop 155, the D and clock inputs of which are tied high. The output of the NAND gate 140 provides an inverted SET signal to the flipflop 155. The noninverting output Q of the flipflop 155 provides and indication of direction, or UP/DOWN. The combination of the COUNT and UP/DOWN signals may be used to drive a digital up/down counter in an otherwise conventional manner.

Figure 4:
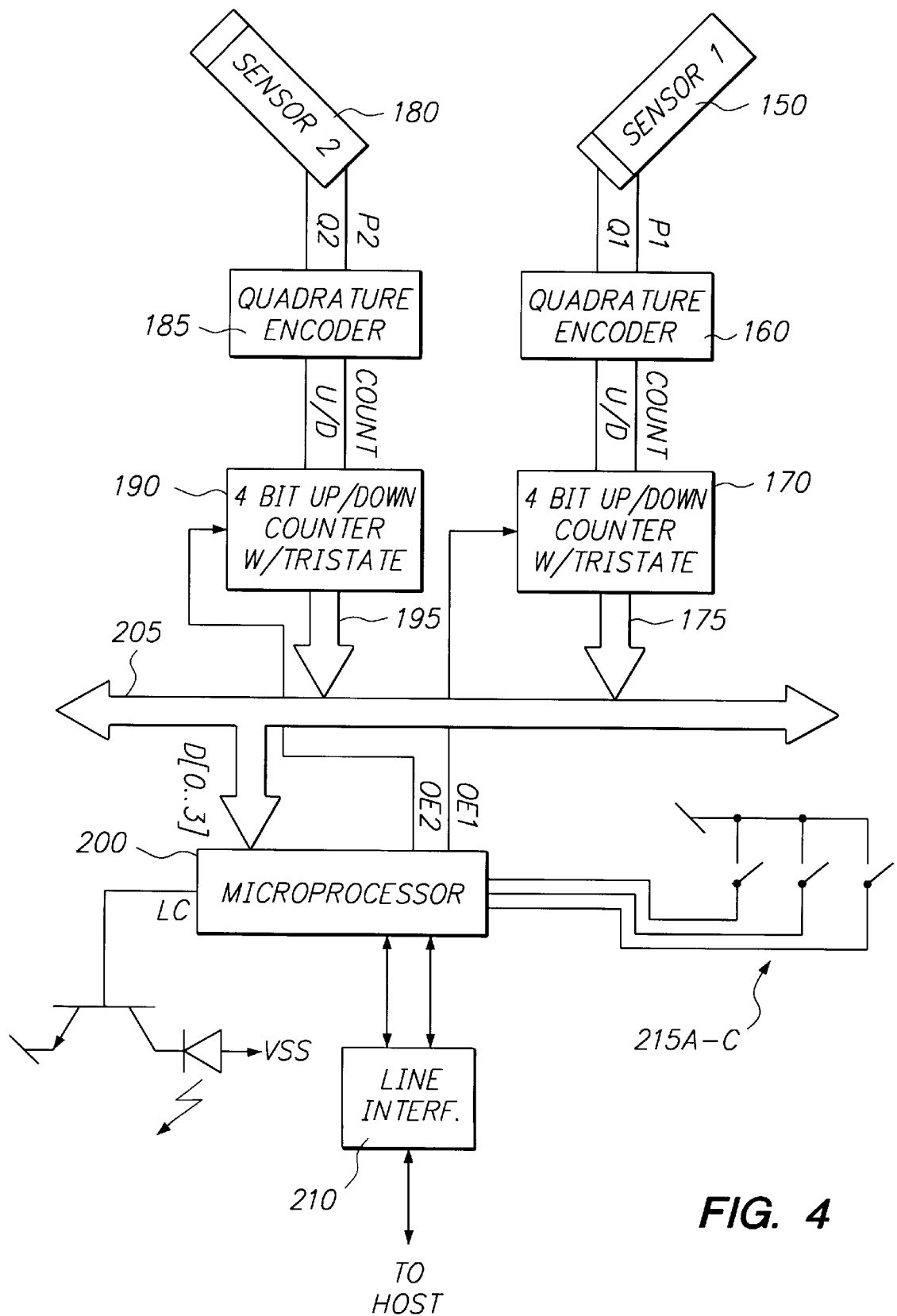
FIG. 4 shows, in simplified schematic block diagram form, the use of two comb detectors in a detector system to detect motion in two dimensions in accordance with the present invention.

Since one detector array 50 is intended to detect displacement only along its length, multiple detector arrays 50 are required to detect motion of the speckled surface in two dimensions. In this regard, FIG. 4 shows in schematic block diagram form an implementation of the present invention using two detector arrays (arranged at ninety degrees relative to one another) to detect motion in two dimensions, with one array to detect motion in the x direction and the second to detect motion in the y direction. In particular, a first array 150 supplies signals P1 and Q1 to a quadrature encoder 160 such as shown in FIG. 3C. The UP/DOWN and COUNT signals from the encoder 160 control a four-bit up/down counter 170, which has a tri-state output 175. Similarly, a second array 180 supplies P2 and Q2 to a quadrature encoder 185, which supplies UP/DOWN and COUNT inputs to another four bit up/down counter 190. The counter 190 has a tri-state output 195.

The microprocessor 200 can selectively read, on a periodic basis, the values of the counters 170 and 190 by selectively enabling signals OE1 and OE2, to cause the output value of the respective counter to appear on the tri-state bus 205. The values of the counters 170 and 190 are combined in accordance with an algorithm described below to generate a displacement report, which can then be formatted in any suitable manner for transmission to a host, such as RS232, PS/2 or ADB. Communication with the host is facilitated through a line interface 210, which typically provides for bidirectional communication. The microprocessor 200 can also control the switching of the coherent light source 10 (FIG. 1), as well as read the value of switches 215A–C. The microprocessor 200 typically reads the counters 170 and 190 frequently enough to avoid overflow of the counters.

The algorithm for combining the values of the counters 170 and 190 involves determining the difference, over time, in the values of the respective counters. Thus, a variable C1 represents the current value of the counter 170, while a variable C2 represents the current value of the counter 190. A value C1old represents the previous value from counter 170, while a value of C2old represents the previous value from counter 190. A value $\Delta$C1 is the difference between C1 and C1old, and represents the displacement from sensor 1, while a value $\Delta$C2 is the difference between C2 and C2old, and represents the displacement from sensor 2.

A value $\Delta$x represents accumulated displacement in direction x, while $\Delta$y represents accumulated displacement in direction y. This leads to $\Delta x = \Delta x + \Delta C1$ and $\Delta y = \Delta y + \Delta C2$.

The total displacement reported to the host is Rx. and Ry, where $Rx = \Delta x/N$ and $Ry = \Delta y/N$, where N is typically on the order of eight to reduce resolution to an acceptable range. After transmission, the accumulators $\Delta$x and $\Delta$y are updated such that $\Delta x = \Delta x$ Mod N and $\Delta y = \Delta y$ Mod N.

Figure 5B:
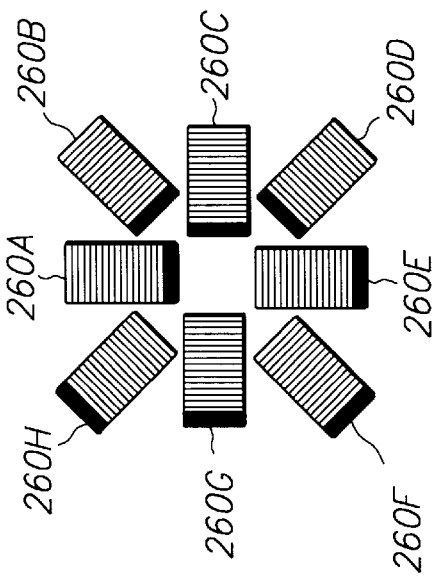
FIGS. 5A–5C shows alternative arrangements of detectors, including one in which multiple images of the same spot are detected in accordance with the present invention.
Figure 5C:
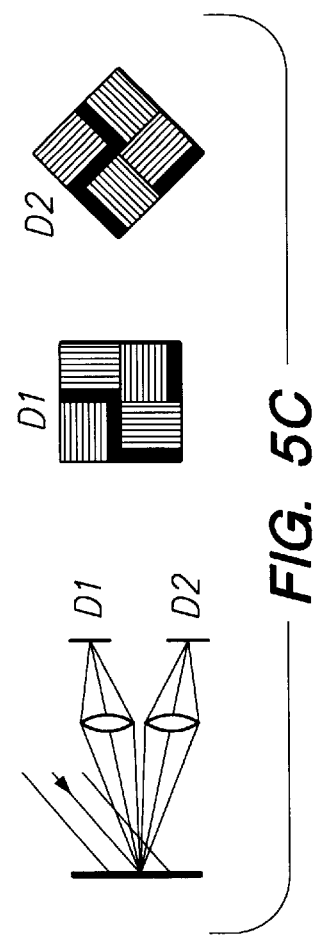
Figure 5A:
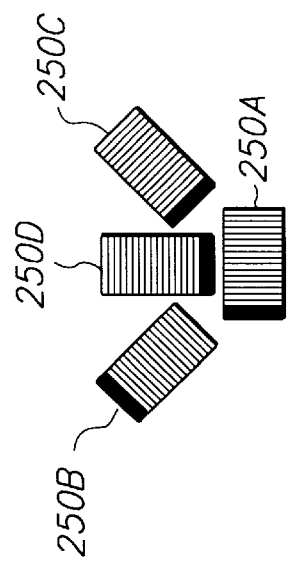

While the two sensor arrangement of FIG. 4 is an acceptable implementation of the present invention in at least some instances, somewhat better performance may be expected in other instances by the use of more than two detector arrays. For example, two additional oblique sensors is presently believed to provide better tolerance to momentary fadeout of the sensor signals. Such fadeout can translate into underestimation of the displacements, since fadeout means the signal does not overcome the hysteresis of the comparators 95 and 105 (FIG. 3A), which results in fewer counts. FIGS. 5A–5C thus illustrate alternative arrangements which use a plurality of detectors 50. For example, FIG. 5A shows four detector arrays 250A–D, with the sensor front end indicated by a thicker black line. Similarly, FIG. 5B shows eight arrays 260A–260H, with the front end again indicated by a thicker black line. In addition, FIG. 5C shows the use of multiple images from a single light source, supplied to multiple detectors D1 and D2, with the arrangement of each detector also shown including a thicker black line indicated the front.

Figure 6:
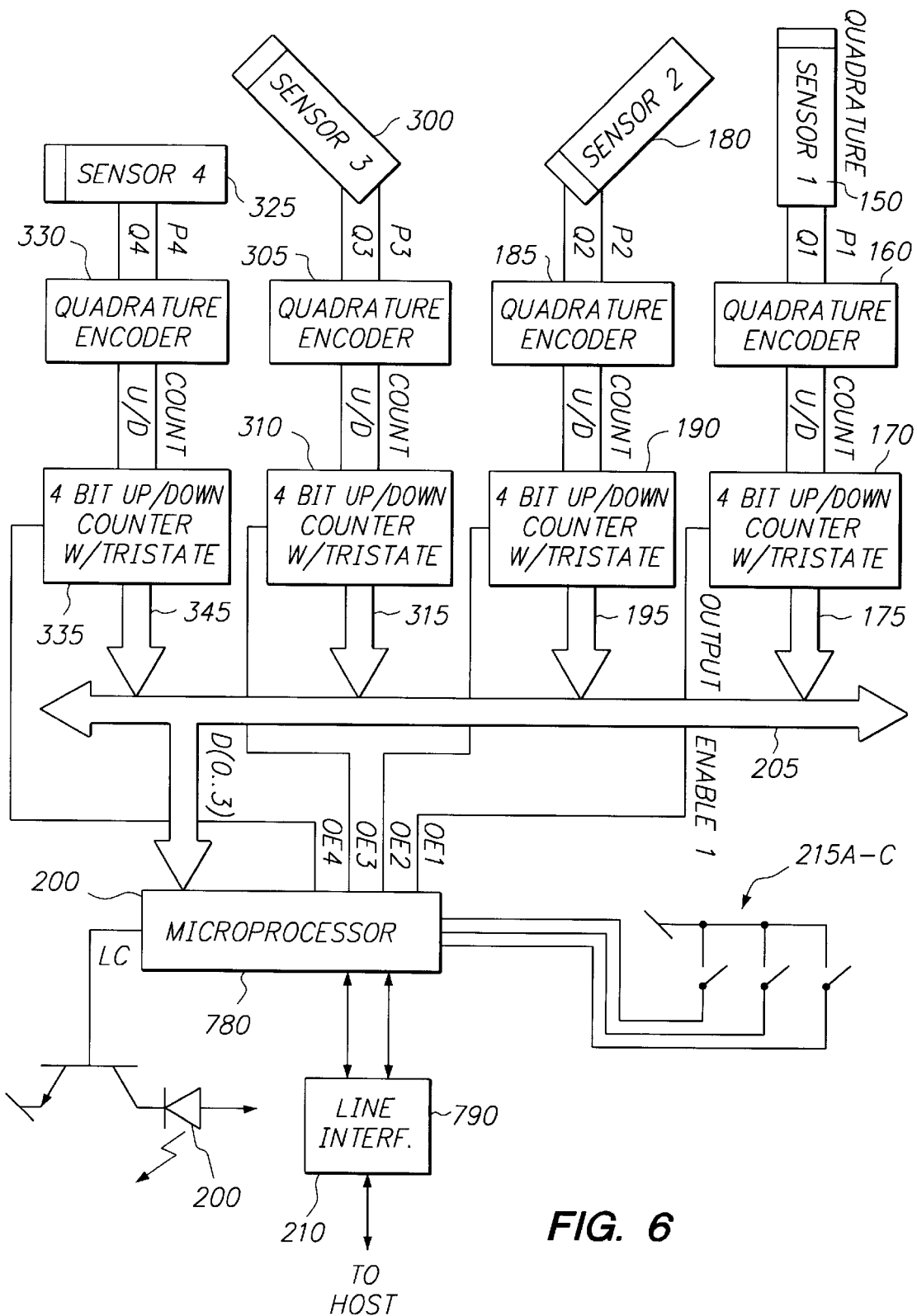
FIG. 6 shows, in schematic block diagram form, the use of four comb detectors for improved detection of motion in two dimensions in accordance with the present invention.

Referring next to FIG. 6, an implementation of the four sensor arrangement of FIG. 5A is shown and can be seen to be an expansion of FIG. 4. The third sensor 300 supplies signals P3 and Q3 to a quadrature encoder 305, which in turn supplies UP/DOWN and COUNT signals to a four bit up/down counter 310 having a tri-state output 315. The fourth sensor 325 similarly supplies P4 and Q4 signals to another quadrature encoder 330, which again supplies UP/DOWN and COUNT signals to a fourth four bit up/down counter 335 with a tri-state output 345. The microprocessor 200 now includes lines OE3 and OE4, in addition to lines OE1 and OE2 shown in FIG. 4, which allows the processor 200 to selectively address the counters 310 and 335, thereby placing their counts on the bus 205.

The algorithm for incorporating the input from the additional sensors is a straightforward expansion of that discussed above in connection with FIG. 4. Thus, C3 represents the value from counter 3, and C4 represents the value from counter 4, while C3old represents the previous value of C3 and C4old represents the previous value of C4. $\Delta$C3 is thus C3 minus C3old, and $\Delta$C4 is thus C4 minus C4old. Likewise, $\Delta x = \Delta x + \Delta C1 + \Delta C2 + \Delta C3$ and $\Delta y = \Delta y + \Delta C4 + \Delta C3 - \Delta C2$.

It will be understood that displacement is a weighted average from the readings of the counter C1 through C4. It should also be noted that displacement in the y direction yields no change in the value of $\Delta$x since the displacements from sensors 2 and 3 (250B and 250C, respectively) cancel out. The same is also true for displacement in the x direction when reading $\Delta$y. The reports Rx. and Ry, are calculated in the same way as for FIG. 4, as are the updates of $\Delta$x and $\Delta$y.

Figure 7:
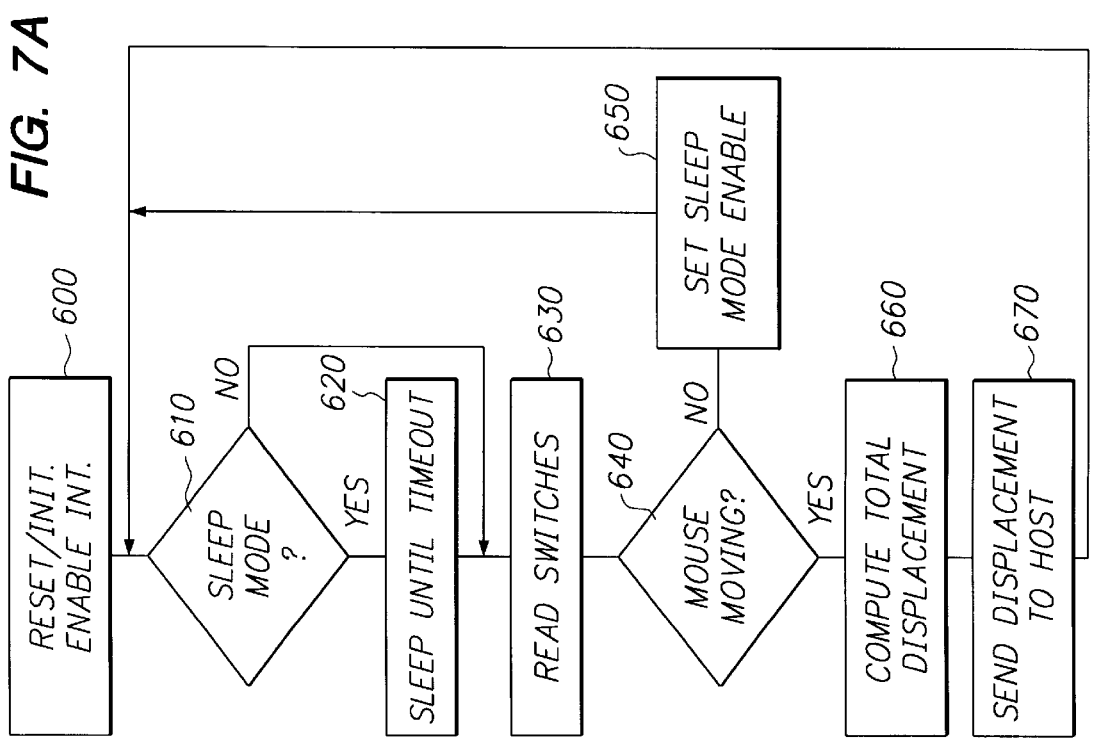
FIGS. 7A and 7B show, in flow diagram form, the operation of a mouse in accordance with the present invention.

Referring next to FIGS. 7A–7B, the firmware for operation of a mouse or other pointing device in accordance with the present invention may be better understood. In particular, the process starts at step 600 by resetting and initializing, and enabling interrupts. The process continues at step 610 by determining whether sleep mode is appropriate; if yes, the electronics go into sleep mode at step 620 until a displacement is detected in a periodic interrupt routine or a time-out occurs. If not, the process skips to step 630, and the switches 215A–C are read. The process continues at step 640 by determining whether the mouse is moving. If not, sleep mode is enabled at step 650; if the mouse is moving total displacement is computed at step 650 and that displacement is sent to the host at step 670. The process then loops to step 610.

Similarly, in FIG. 7B, the periodic interrupt service routine can be better understood. The interrupt service routine is accessed at step 700 whenever a timer function from the microprocessor generates an interrupt, although other methods of generating an interrupt are also acceptable in at least some embodiments. The process to step 710 where the interrupt is acknowledged. The process then moves to step 720 where the outputs of the four counters are obtained, the $\Delta$x and $\Delta$y values are updated, and where a non-zero computed displacement brings the system out of the sleep mode. The process then moves to step 730, where the time until the next interrupt is computed. Finally, the process returns from the interrupt at step 740.

In another embodiment of the present invention, a detector is modified to reduce the effects of, for example, non-uniform surface reflectance. Non-uniform surface reflectance occurs when a user moves the mouse over a surface having printed material, or any other surface having transitions of light and dark.

Figure 8:
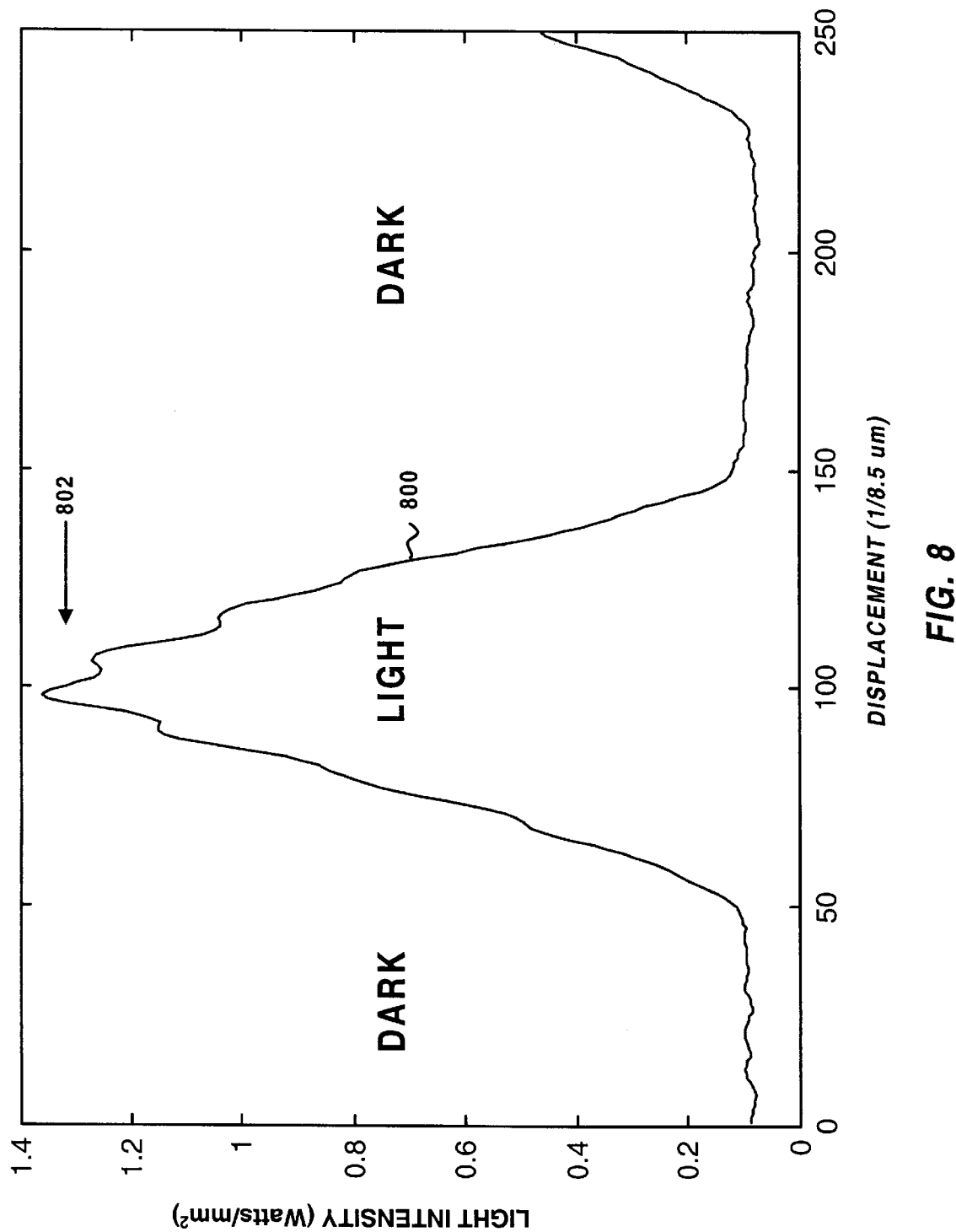
FIG. 8 is a plot of a light intensity profile over a dark-light-dark transition region in accordance with the present invention.

Referring to FIG. 8, there is shown a plot of a light intensity profile 800 over a dark-light-dark transition region in accordance with the present invention. The vertical axis of the plot in FIG. 8 represents light intensity in Watts/mm$^2$. The horizontal axis of the plot represents displacement in 8.5 μm/step. The light intensity profile 800 is what an optical mouse "sees" as it traverses a dark-light-dark transition region (e.g., a white line on a dark surface). The large spike 802 in the light intensity profile 800 is indicative of a large increase in light intensity as the mouse travels over the dark-light-dark transition region. Abrupt transitions, such as the large spike 802, can corrupt the period count measurement used to determine mouse displacement and direction. Since the mouse relies on zero voltage crossing detection to determine displacement and direction, a zero voltage reference 904 must be crossed regularly, even when the mouse travels over, for example, printed material.

Figure 9:
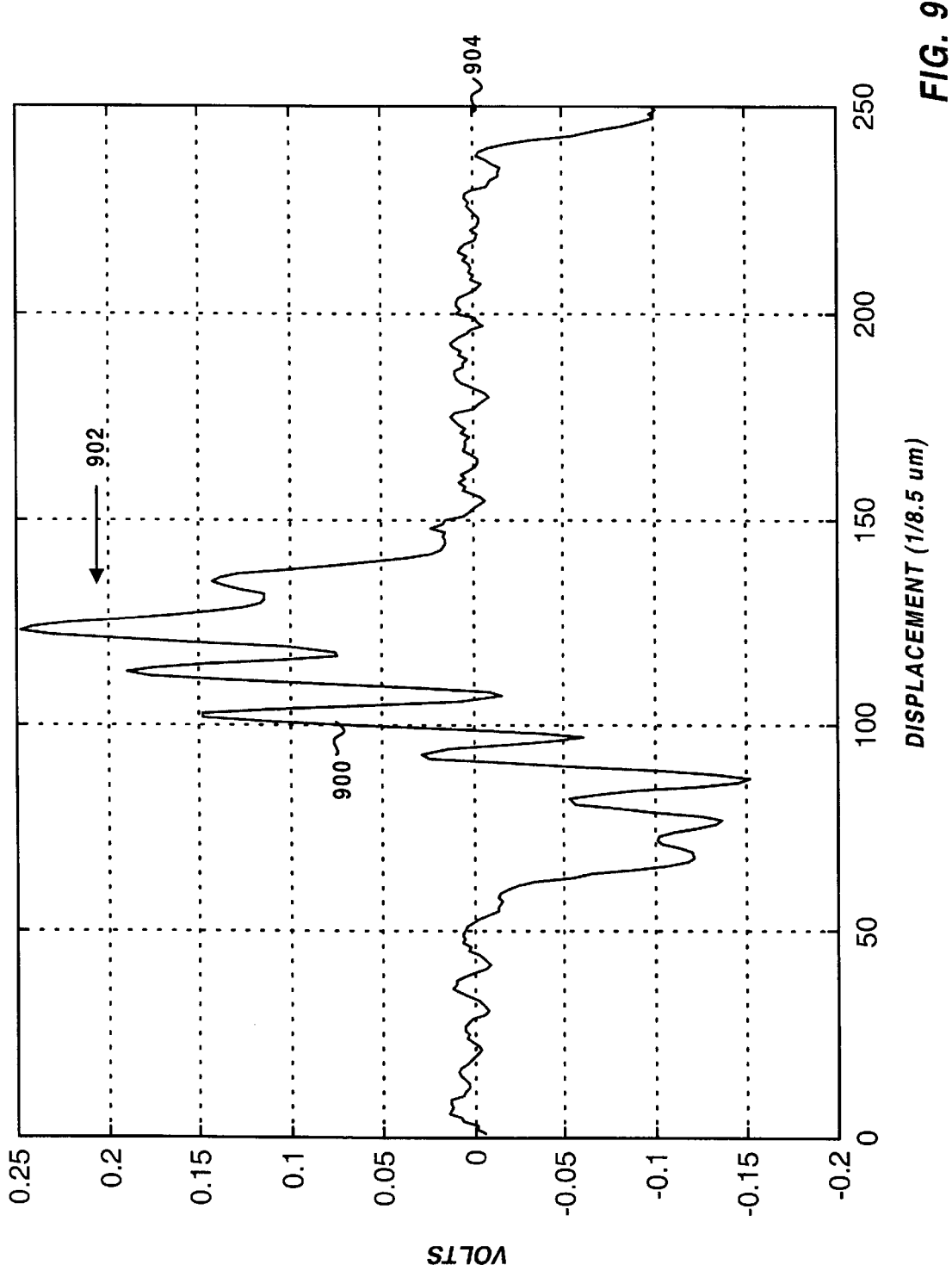
FIG. 9 is a plot of a quasi-sinusoidal signal corrupted by the effects of non-uniform surface reflectance.

Referring to FIG. 9, there is shown a plot of a quasi-sinusoidal signal 900 corrupted by the effects of non-uniform surface reflectance. The vertical axis of the plot represents the magnitude of the quasi-sinusoidal signal 900 in volts. The horizontal axis of the plot represents displacement in one dimension in 8.5 μm/step (hereinafter also referred to as the "x-axis"). The signal 900 includes an offset 902 that peaks at a displacement of about 125×8.5 μm. The offset 902 is generated by a user moving the mouse over the dark-light-dark transition, as previously described above with respect to FIG. 8. The offset 902 is the "baseline" or the mean value over which a fluctuation takes place. In response to the mouse traveling, oscillations about the offset 902 occur in signal 900. The oscillation varies in amplitude, typically being large in light regions, while being small in dark regions. Hence, oscillation takes place consistently over the shown displacement. These offset oscillations, which can be positive or negative, do not cross the zero voltage reference 904 during the dark-light-dark transition, and therefore are not detected or counted. Thus, the plot in FIG. 9 illustrates a need to attenuate the contributions from non-uniform surface reflectance, which manifests itself as a time varying offset 902 added to the quasi-sinusoidal signal.

Figure 10:
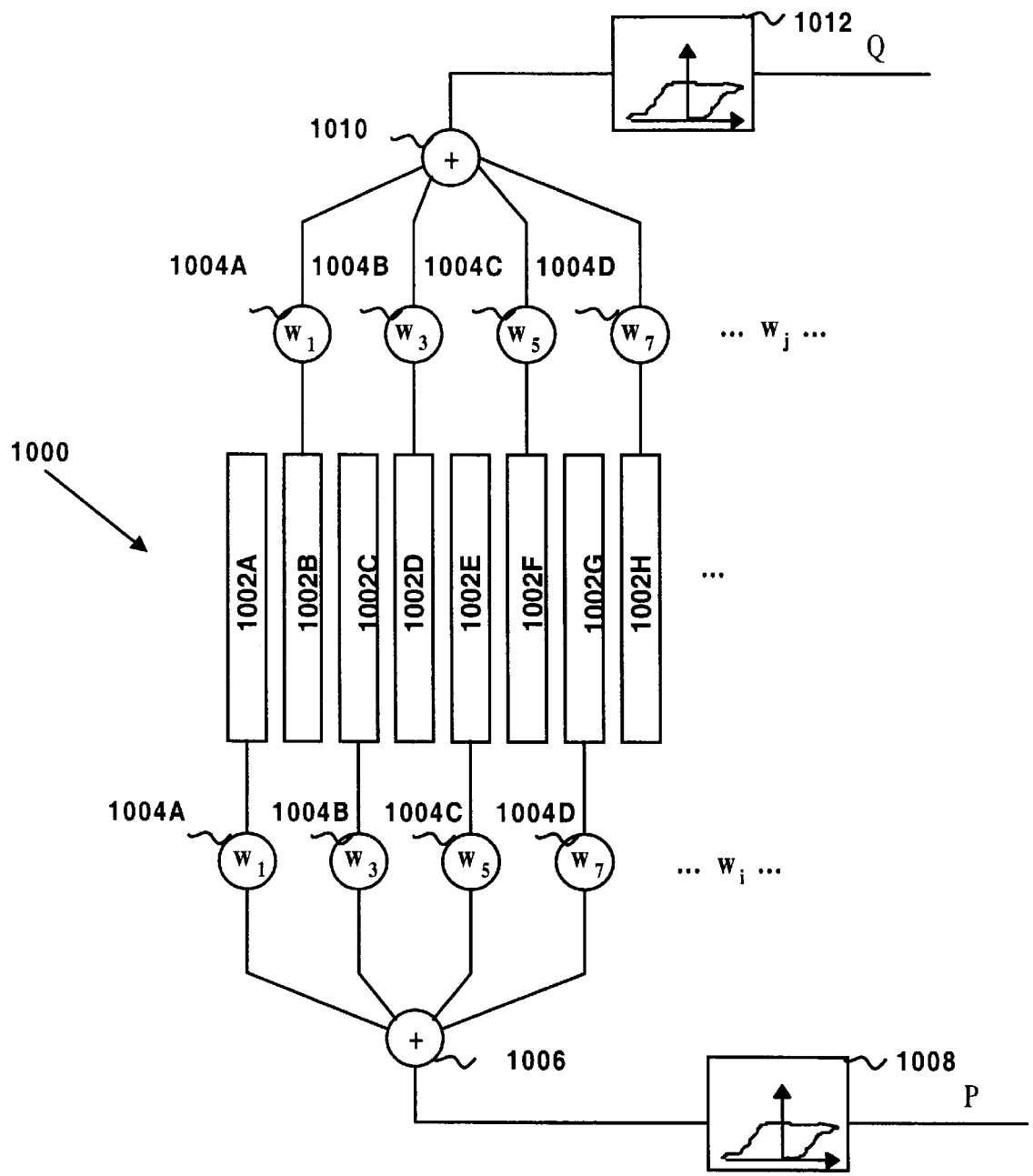
FIG. 10 is a block diagram of a sparse strip detector for providing band-limited quasi-sinusoidal signals in accordance with the present invention.

Referring to FIG. 10, there is shown a block diagram of a sparse strip detector 1000 for providing band-limited quasi-sinusoidal signals in accordance with a preferred embodiment of the present invention. The sparse strip detector 1000 includes a plurality of detector elements 1002A–H, weighting parameters 1004A–D, summing circuits 1006, 1010, and comparators 1008, 1012. Generally, the detector elements 1002A–H are combined to form the sparse strip detector 1000, wherein the output of each of the detector elements 1002A–H is weighted before being summed by summing circuits 1006, 1010. The sparse strip detector 1000 is similar to the comb array detector 50 previously described with respect to FIG. 2A. Thus, the sparse strip detector 1000 may have an overall length L, a height S, and a distance Λ between coupled detector elements, thus forming the period of the sparse strip structure 1000, as previously described with respect to FIG. 2A.

More particularly, weighting parameters 1004A–D are applied to the outputs of detector elements 1002A, 1002C, 1002E, and 1002G, respectively, before being summed by summer circuit 1006. Similarly, weighting parameters 1004A–D are applied to the outputs of detector elements 1002B, 1002D, 1002F, and 1002H, respectively, before being summed by summing circuit 1010. The output of summing circuit 1006 is provided to comparator 1008, while the output of summing circuit 1010 is provided to comparator 1012, respectively. The comparators 1008 and 1012 each have a symmetrical hysterisis around zero and a voltage output of, for example, 0 volts or 5 volts. The output of comparator 1008 is an in-phase signal P, while the output of comparator 1012 is a quadrature signal Q. The purpose of comparators 1008 and 1012 is to provide digital signals 5 from the quasi-sinusoidal signals generated by detector elements 1002A–H, which facilitates interfacing output signals P and Q to digital counters for measurement of a period count, as described with respect to FIGS. 3A–3C and 4.

The weighting parameters 1004A–D are determined for a Finite-Impulse-Response ("FIR") filter using known techniques. The purpose of the FIR filter is to attenuate the low-frequency offset while producing high frequency oscillation as the mouse travels over a surface. In the preferred embodiment, a band pass filter can be used for this purpose.

For the sparse strip detector 1000, interim FIR filters are low-pass and high-pass equivalent filters from which a band-pass filter is obtained. This procedure produces a weighting parameters, where every second weight is zero, thereby allowing the use of a sparse structure. Two known techniques that work equally well for determining the weighting parameters 1004A–D are the Parks-McCellan and Remez digital filter design techniques. The above techniques are described in the Matlab Signal Processing Toolbox User's Guide, Matlab 5.0, FIR Filter Design, December 1996, which is incorporated by reference herein in its entirety.

To implement the above techniques in the design of the sparse strip detector 1000, the designer first specifies certain design parameters for a FIR low pass filter, including, for example, a pass band, a stop-band, and the number of weighting parameters (hereinafter also referred to as "filter order" or "coefficients") The above design parameters are selected based on empirical observations of the spatial frequency content of non-uniform surface reflectance. Ideally, the stop band and pass bands are selected to attenuate undesired spatial frequencies of disturbances, and to pass desired spatial frequencies of output signals from the detector elements 1002A–H, respectively. It has been observed that the effects of non-uniform surface reflectance are of relatively low spatial frequency, and are in the range of about 0 to 5 line pairs per mm (0 to 5/mm), which can be found on most printed material.

The number of weighting parameters is determined by several constraints including speed, accuracy, and cost. Generally, the greater the number of weighting parameters, the more faithfully the filter can provide the desired frequency response.

Once the design parameters of a FIR low pass filter are selected, the Parks-McClellan or Remez techniques are performed using the specified design parameters. The Parks-McClellan or Remez design techniques can be implemented on a personal computer. The output of these techniques is a set of weighting parameters. Once the FIR low pass filter is designed, it is converted to a high pass filter by, for example, flipping the sign for every odd coefficient or weight. The high pass filter is then converted to a band-pass filter by up-sampling the filter by two, using well-known signal processing techniques. One technique for up-sampling is to insert a zero weight between every other weight. The zero weight between every other weight makes it possible to apply the sparse structure. TABLE I below provides values for weighting parameters 1004A–D in the preferred embodiment.

TABLE I

| | |
|---|---|
| $W_1$ | −0.3354 |
| $W_3$ | 1.0000 |
| $W_5$ | −1.0000 |
| $W_7$ | 0.3354 |

The above weighting parameters were derived using the FIR filter procedure described above. Specifically, the filter order was specified as 3, the pass band was specified to be between 0.0 and 0.05, and the stop band was specified to be between 0.95 and 1.0, where 1.0 is the normalized Nyquist frequency. The Nyquist frequency is defined as being half the sampling frequency. Normalizing a frequency means dividing it by the Nyquist frequency. For the multi-element detector, the Nyquist frequency is half the sampling period, and the sampling period is the distance between two adjacent detector strips. Thus, the Nyquist frequency is equal to $2/\Lambda$. The stop band fit is approximately one hundred times the fit in the pass band to place emphasis on stop band attenuation.

It can be observed from TABLE I above, that weighting parameters $W_1$ and $W_7$ are smaller than weighting parameters $W_3$ and $W_5$, and therefore provide a tapered envelope of the impulse response of the spatial filter defined by the weights. The impulse response is simply the output of the filter when an impulse is applied as input. It is well-known that the input and output of a FIR filter are related through the impulse response of the filter. The tapered envelope impulse response exhibits a band-pass effect in the spatial frequency domain, and therefore may be classified as a band-pass filter.

Referring to FIGS. 11A and 11B, there are shown plots of the frequency response of the sparse strip detector 1000 shown in FIG. 10. Specifically, FIG. 11A is a plot of the magnitude response 1100 in decibels (dB) of the spatial filter defined by the weighting parameters listed in TABLE I. For purposes of discussion, only the range of spatial frequency from about zero to about the Nyquist frequency is of interest, or equivalently only the normalized range of spatial frequency from about 0.0 to about 1.0 is of interest. The spatial frequency is expressed as 1/meter, and is analogous to 1/seconds for Hertz. It can be observed from FIG. 11A that there is a ripple in the stop bands 1102 at spatial frequencies around 0.0 and 1.0. The ripple results from truncation of the impulse response. It is well-known that an infinite-length impulse response cannot be realized with an FIR filter. One way the ripple can be reduced is by increasing the number of weighting parameters used in the filter, as described in further detail with respect to FIGS. 13, 14A, and 14B. The impact of the ripple is low since the signal is highly attenuated in this frequency band (e.g.,>70 dB attenuation).

FIG. 11B is plot of the phase 1104 (in degrees) of the filter defined by the weighting parameters in TABLE I. It is noted that phase 1104 is linear between the spatial frequencies of 0.0 and 1.0, wherein 1.0 is the a normalized Nyquist frequency. Like the magnitude response, a ripple occurs at the stop bands 1106 at frequencies around 0.0 and 1.0.

Figure 12:
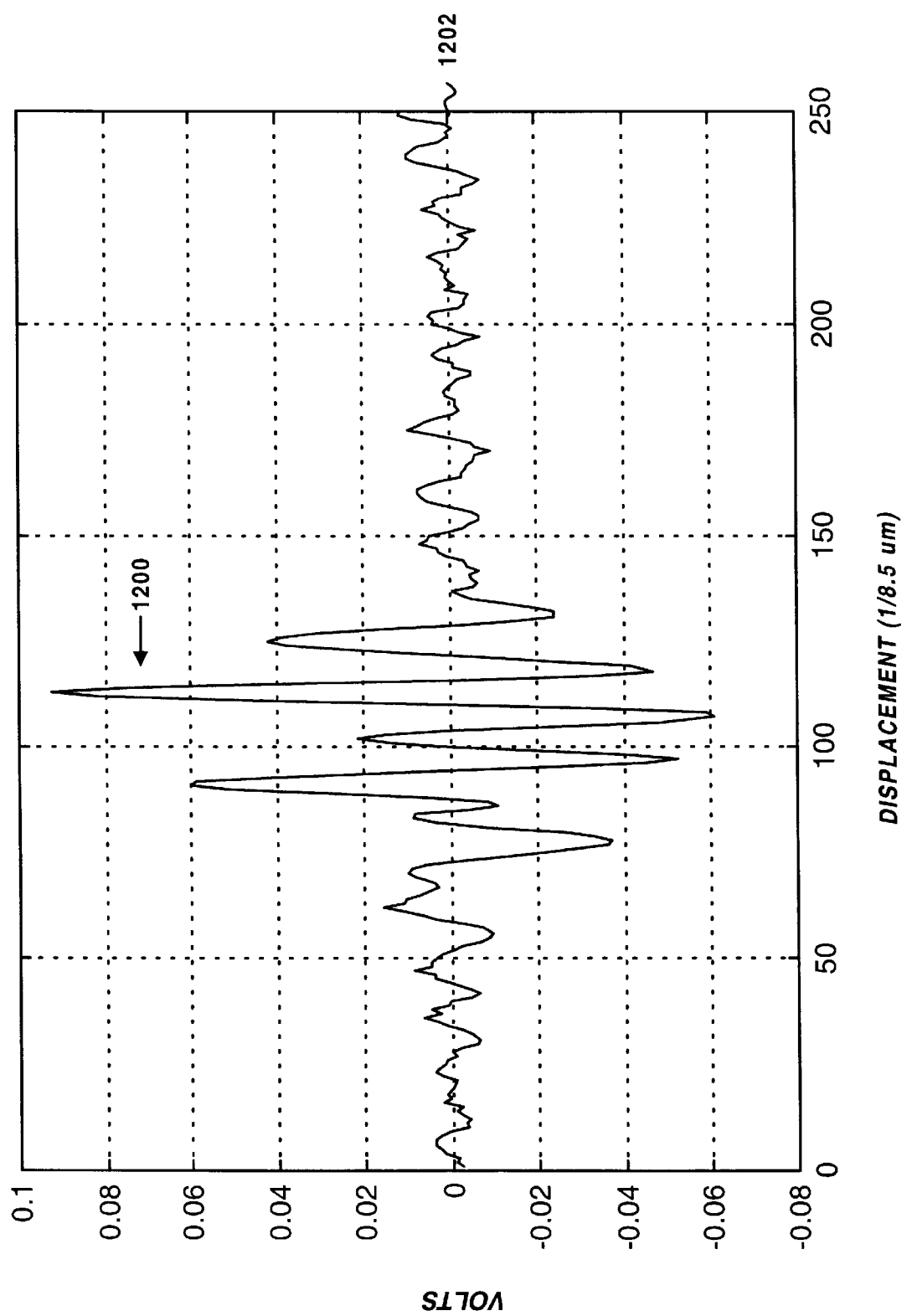
FIG. 12 is a plot of a quasi-sinusoidal signal having the effects of non-uniform surface reflectance reduced by the sparse strip detector shown in FIG. 10 in accordance with the present invention.

Referring to FIG. 12, there is shown a plot of a quasi-sinusoidal signal 1200 having the effects of non-uniform surface reflectance substantially eliminated by the sparse strip detector 1000 shown in FIG. 10. As in FIG. 9, the vertical axis represents a normalized magnitude of the quasi-sinusoidal signal 1200 in volts, and the horizontal axis represents the distance traveled by the mouse in 8.5 $\mu$m steps.

An advantage of the present invention is apparent from the comparison of the plots in FIGS. 9 and 12. It is observed from the comparison of these plots that the offset 902 in the transition region (dark-light-dark) has been substantially eliminated, thus ensuring the proper detection of zero voltage crossings about the zero voltage reference 1202 to determine mouse displacement and direction. It is also observed that the oscillation frequency regularity (e.g., the regularity between two zero crossings of the signal 1200 in the transition region) is also reduced. This effect occurs because the band-limited quasi-sinusoidal signals have a larger bandwidth than the unfiltered quasi-sinusoidal signals. Tapering the impulse response improves low frequency attenuation but creates a broader pass-band, which in turn translates into less regular locations of zero crossings. This phenomenon, however, has no impact on a user's perception of cursor movement when the mouse is moved over the transition region.

Figure 13:
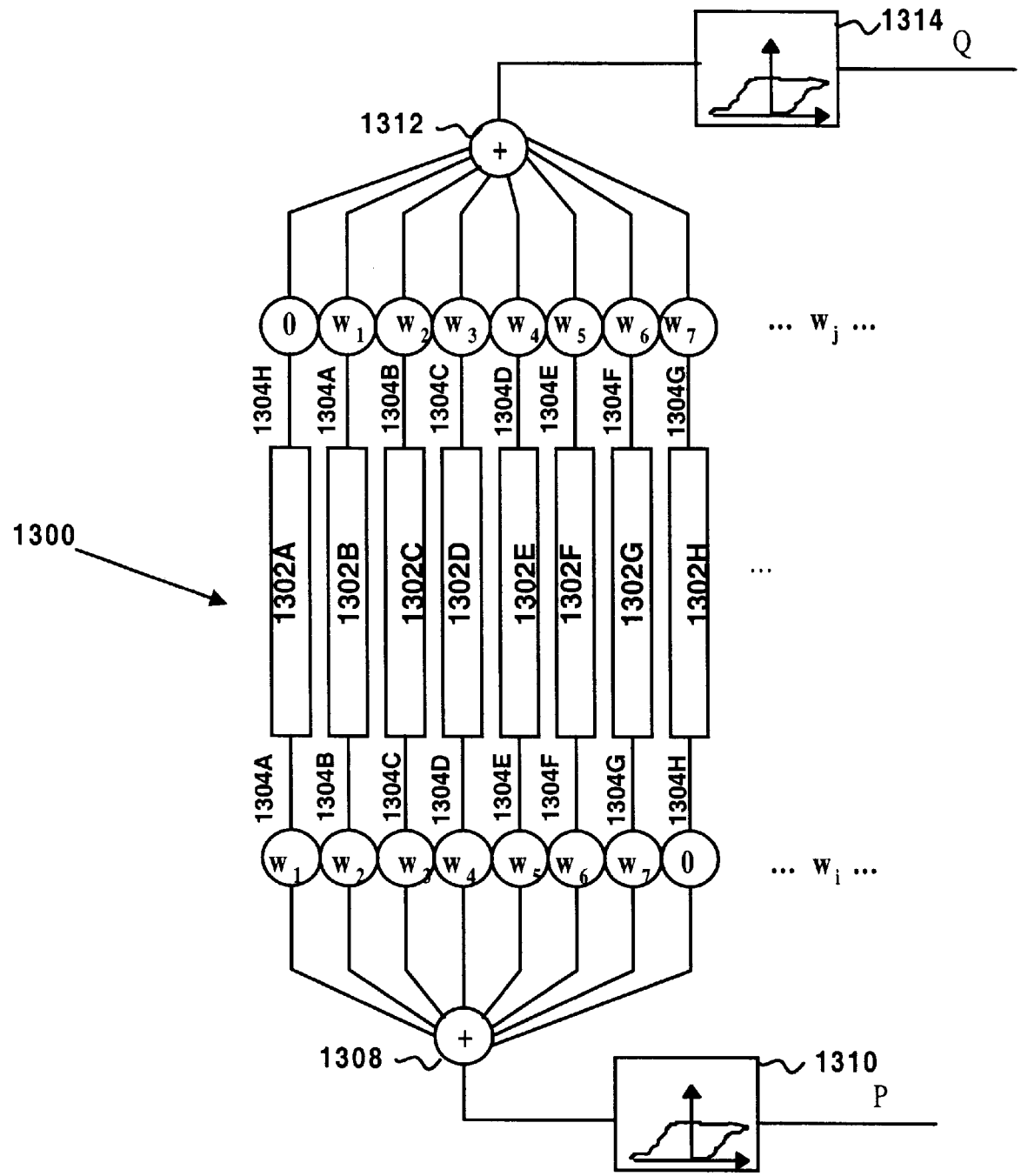
FIG. 13 is a block diagram of a full strip detector for providing band-limited quasi-sinusoidal signals in accordance with the present invention.

It is noted that while only four weighting parameters were used in the preferred embodiment, more or less weights can be used without departing from the spirit and scope of the present invention, as described with respect to FIG. 13. The sparse strip structure 1000 described with respect to FIG. 10 is easily integrated into existing optical mouse designs, and provides the appropriate amount of attenuation of non-uniform illumination or surface reflectance to allow the optical mouse to function properly over a variety of surfaces, including those surfaces having printed material.

It is further noted that while the weighting parameters listed in TABLE I are symmetrical, non-symmetrical weighting parameters are also possible without departing from the spirit and scope of the present invention.

Referring to FIG. 13, there is shown a block diagram of a full strip detector 1300 for providing band-limited signals in accordance with one embodiment of the present invention. The full strip detector 1300 includes detector elements 1302A–H, weighting parameters 1304A–H, summing circuits 1308, 1312, and comparators 1310, 1314.

For the in-phase signal P, weighting parameters 1304A–H are applied to the outputs of detector elements 1302A–H, respectively, before being summed by summer circuit 1308. The output of summing circuit 1308 is provided to comparator 1310. It is noted that weighting parameter 1304H is set equal to zero.

For the quadrature signal Q, weighting parameter 1304H (i.e., zero weight) is applied to the output of detector element 1302A, and weighting parameters 1302A–1302G are applied to the outputs of detector elements 1302B–H, respectively, before being summed by summer circuit 1312. The output of summing circuit 1312 is provided to comparator 1314.

The comparators 1310, 1314 each have a symmetrical hysteresis around zero and a voltage output of, for example, 0 volts or 5 volts. The output of comparator 1310 is an in-phase signal P, while the output of comparator 1314 is a quadrature signal Q. The purpose of comparators 1310 and 1314 was previously described in detail with respect to FIGS. 3A–3C and 4. Unlike the sparse strip detector 1000, a desired frequency response is chosen for a band-pass filter, rather than a low pass filter. The parameters specified include: a pass band, a stop-band, and either a filter order or a stop band attenuation factor. Once the above parameters are selected, a filter design technique (e.g., Parks-McClellan or Remez ) is performed using the specified design parameters, as previously described above with respect to FIG. 10. The design procedure produces a set of weighting parameters. TABLE II below provides values for the weighting parameters 1304A–G. The weighting parameter 1304H is set to zero.

TABLE II

| | |
|---|---|
| $W_1$ | −0.0243 |
| $W_2$ | −0.2479 |
| $W_3$ | 0.0242 |
| $W_4$ | 0.5075 |
| $W_5$ | 0.0242 |
| $W_6$ | −0.2479 |
| $W_7$ | −0.0243 |

The above weighting parameters were derived using the band-pass filter procedure described above. Specifically, the filter order was specified as 7, the first stop band was specified to be between 0.0 and 0.01 , the pass band was specified to be between 0.42 and 0.52, and the second stop band was specified to be between 0.99 and 1.0, where 1.0 is the normalized Nyquist frequency.

Figure 14A:
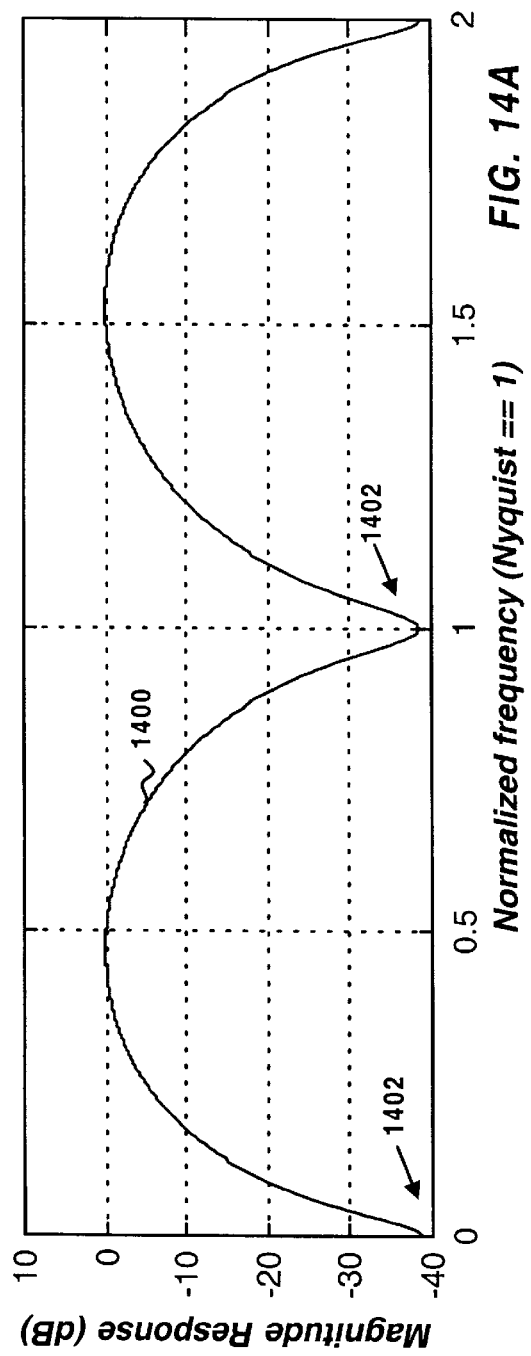
FIGS. 14A–14B are plots of the frequency response of the full strip detector shown in FIG. 13 in accordance with the present invention.
Figure 14B:
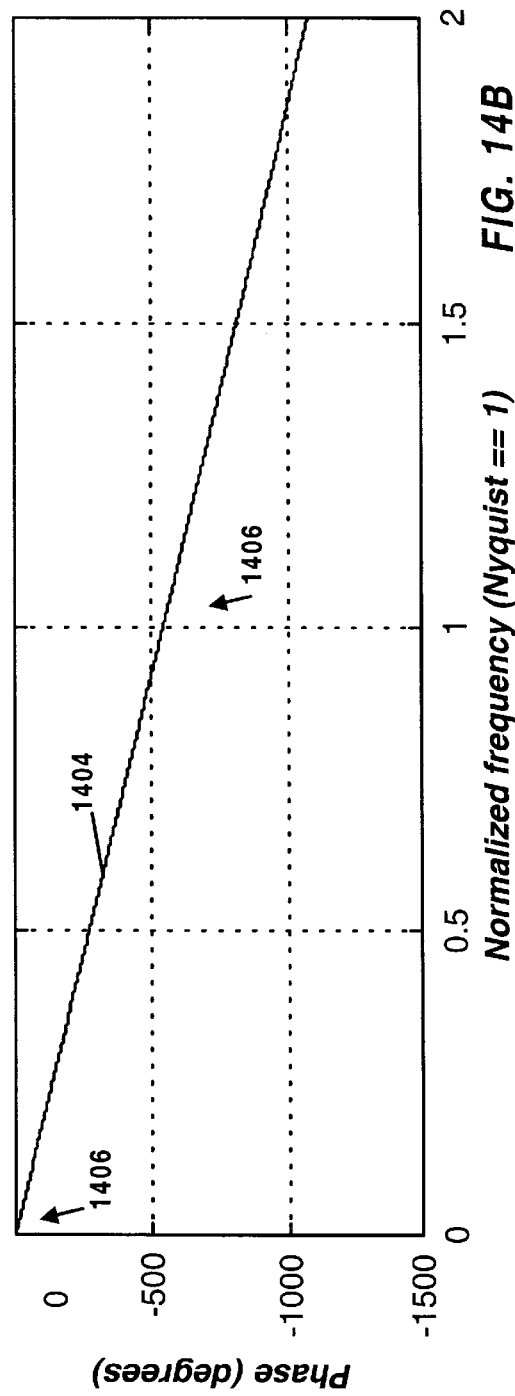

Referring to FIGS. 14A and 14B, there are shown plots of the frequency response of the full strip structure 1300 in FIG. 13. Specifically, FIG. 14A is a plot of the magnitude response 1400 (dB) of the spatial filter defined by the weighting parameters listed in TABLE II. It can be observed from FIG. 14A that there is no ripple in the stop bands 1402 around spatial frequencies 0.0 and 1.0. The ripple was eliminated by increasing the number of weighting parameters used in the filter from 3 to 7. The reduction of ripple in the stop bands 1402 provides a frequency response that better approximates the desired frequency response. However, this filter design results in a filter having smaller attenuation in the stop band (e.g., 40 dB versus 70 dB for the sparse strip detector 1000).

FIG. 14B is a plot of the phase 1404 of the filter defined by the weighting parameters in TABLE II. It is noted that that phase 1404 is linear between the spatial frequencies of 0.0 and 1.0, wherein 1.0 is the a normalized Nyquist frequency. Like the magnitude response, there is no ripple at the stop bands 1406 around spatial frequencies 0.0 and 1.0.

An advantage of the full strip detector 1300 described above is that every output is weighted before being summed. The additional weights provide a closer approximation to the desired frequency response.

Figure 15:
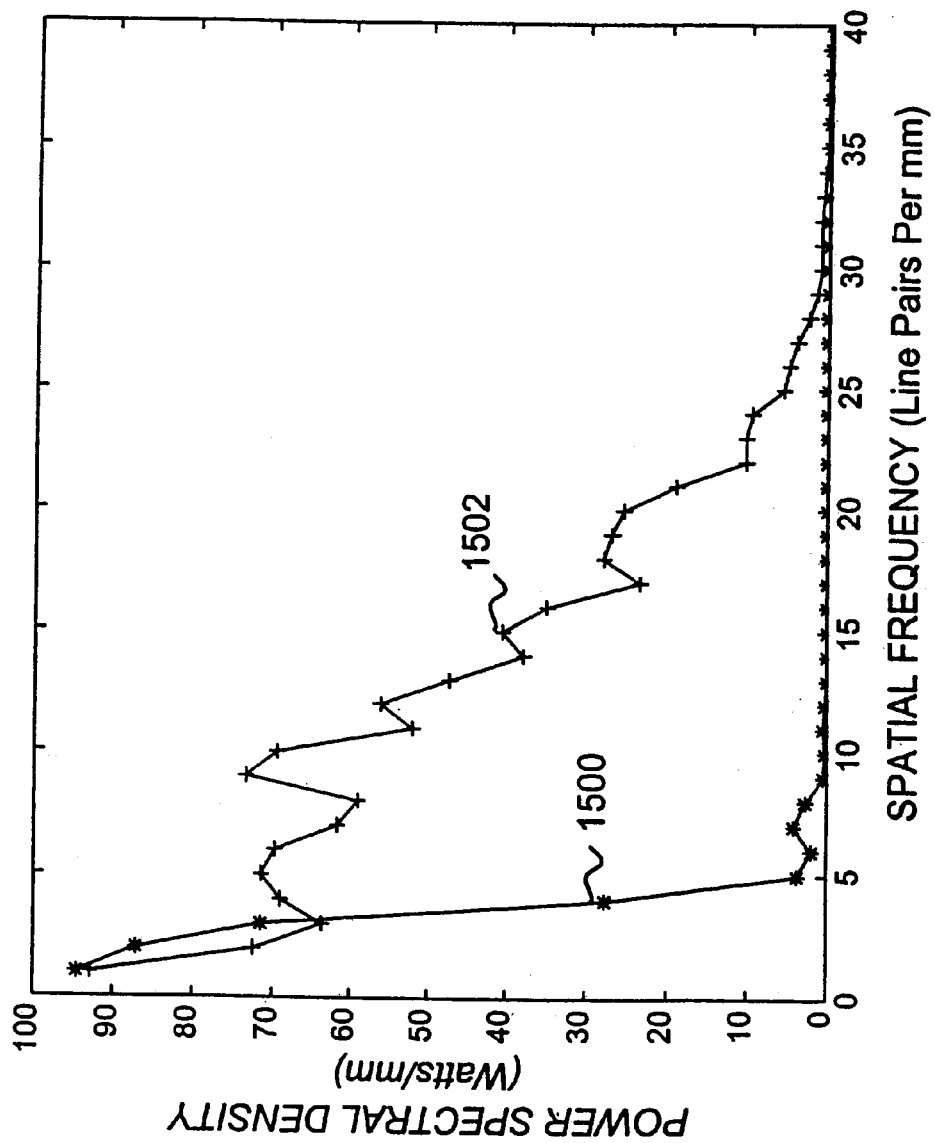
FIG. 15 is plots of the spatial frequency power spectrums for printed material and a speckled pattern in accordance with the present invention.

Referring to FIG. 15, there are shown plots of a speckle spatial power spectrum 1502 and a printed material power spectrum 1500 (e.g., black letters on white background), based on their respective light intensity fields in the image plane of a sensor. It is noted that the maximum frequency shown in FIG. 15 is 40 line pairs per mm. In FIG. 15, it is also observed that the speckle spatial power spectrum 1502 substantially overlaps the printed material power spectrum 1500 in the spatial frequency domain, as shown in FIG. 15. Having sufficient frequency overlap in the power spectrums 1500 and 1502 ensures that the light intensity field generated by the printed material can be properly attenuated, while a sufficient fraction of the light intensity field generated by the speckled pattern can be passed through the filter. To ensure the proper amount of overlap between power spectrums 1500 and 1502 in the frequency domain, the size of each speckle in the speckled pattern (See FIG. 1) should be smaller than the printed material. This constraint can be enforced by observing that most beam illumination profiles and reflective surfaces have limited energy at spatial frequencies above a predetermined spatial frequency, for example, 5 line pairs per mm. Accordingly, the speckle size should be small enough to generate an intensity field that has spatial frequency content that extends over a frequency range beyond the predetermined spatial frequency.

The preferred weighting parameters for detector element outputs which have been observed to reduce non-uniform effects are listed in TABLE I above. The weighting parameters in TABLE I work adequately with a speckle size that is less than about 100 μm, which is the size of the smallest printed pattern likely to be encountered by an optical mouse. In a preferred embodiment of the present invention, the speckle size was selected to be about 30 μm.

Having described in detail two types of filters for attenuating the effects of non-uniform surface reflectance, the implementation of such filters into an optical mouse will now be described. Filters can be implemented in an optical mouse in at least three domains: the digital domain, the analog domain, and the charge domain. Each implementation will now be described, in turn, below.

Digital Domain Implementation

In a digital implementation, an A/D converter is used to scan and convert into digital representations the analog outputs of a plurality of detector strips in, for example, a comb array detector. The analog value that is converted to a digital representation is a voltage measurement of the light intensity impinging the strip by means of, for example, a transimpedance amplifier. The transimpedance amplifier converts photocurrent into voltage.

At the output of the A/D converter, the digitized strips are combined and digitally filtered using conventional FIR digital filtering techniques, implemented in either dedicated hardware (e.g., multiply-add circuits), or a general purpose DSP. Sign detection with hysterisis can also be performed in the digital domain.

Analog Domain Implementation

In the analog implementation, voltages are measured that reflect the light intensity impinging the strips. These voltages are weighted and added using a resistor network configuration, or preferably a switch capacitor weighted-sum structure for more accurate weight precision.

Charge Domain Implementation

Figure 16:
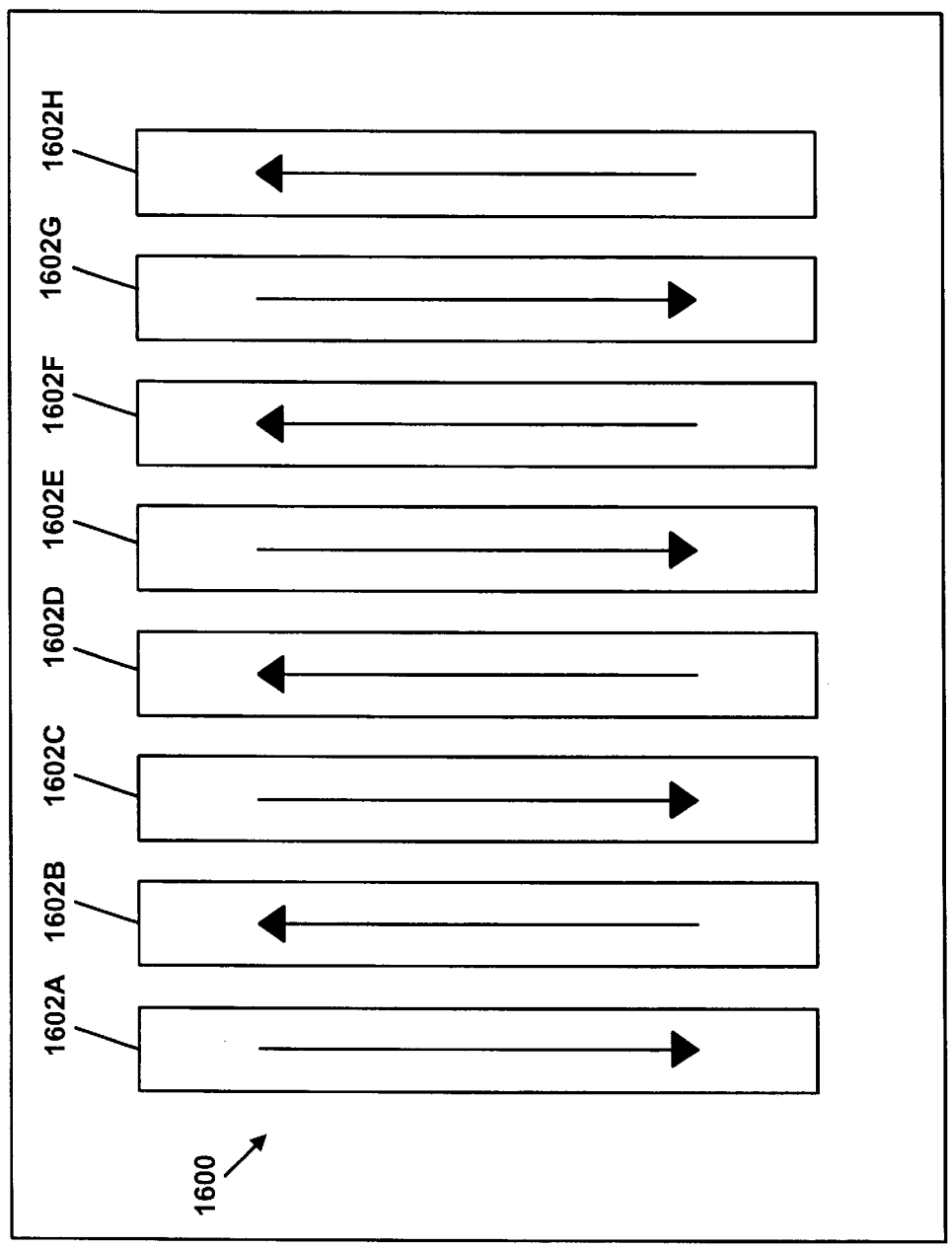
FIG. 16 is a block diagram illustrating charge transport in two directions along a plurality of detector elements in a comb detector array in accordance with the present invention.

Referring to FIG. 16, there is shown a block diagram illustrating charge transport in two directions along detector strips 1602A–H (hereinafter also referred to as "strips 1602A–H") of a strip detector 1600 in accordance with a preferred embodiment of the present invention. Using a charge-coupled-device (CCD), or a bucket-brigade-device (BBD), photocharges generated by photons impinging strips 1602A–H are transported along the length of strips 1602A–H so as to accumulate charge at one end of each strip 1602A–H. By inverting the transport direction for odd numbered and even numbered strips 1602A–H, photocharges that contribute to define an in-phase signal P are transported to one end of the odd numbered strips 1602A, 1602C, 1602E, and 1602G, while photocharges that contribute to define a quadrature signal Q are transported to the other end of the even numbered strips 1602B, 1602D, 1602F, and 1602H, as shown in FIG. 16. The charges that accumulate at the ends of the strips 1602A–H are transported to, for example, readout capacitors, where the charges are converted to voltage using conventional CCD techniques. The weighting of charges generated by the strips 1602A–H is achieved by means of, for example, a weighted sum charge integrator using known switch capacitor techniques. Alternatively, if the sparse weighted detector 1000 shown in FIG. 10 is used, a charge "dumping" technique can be employed.

Figure 17:
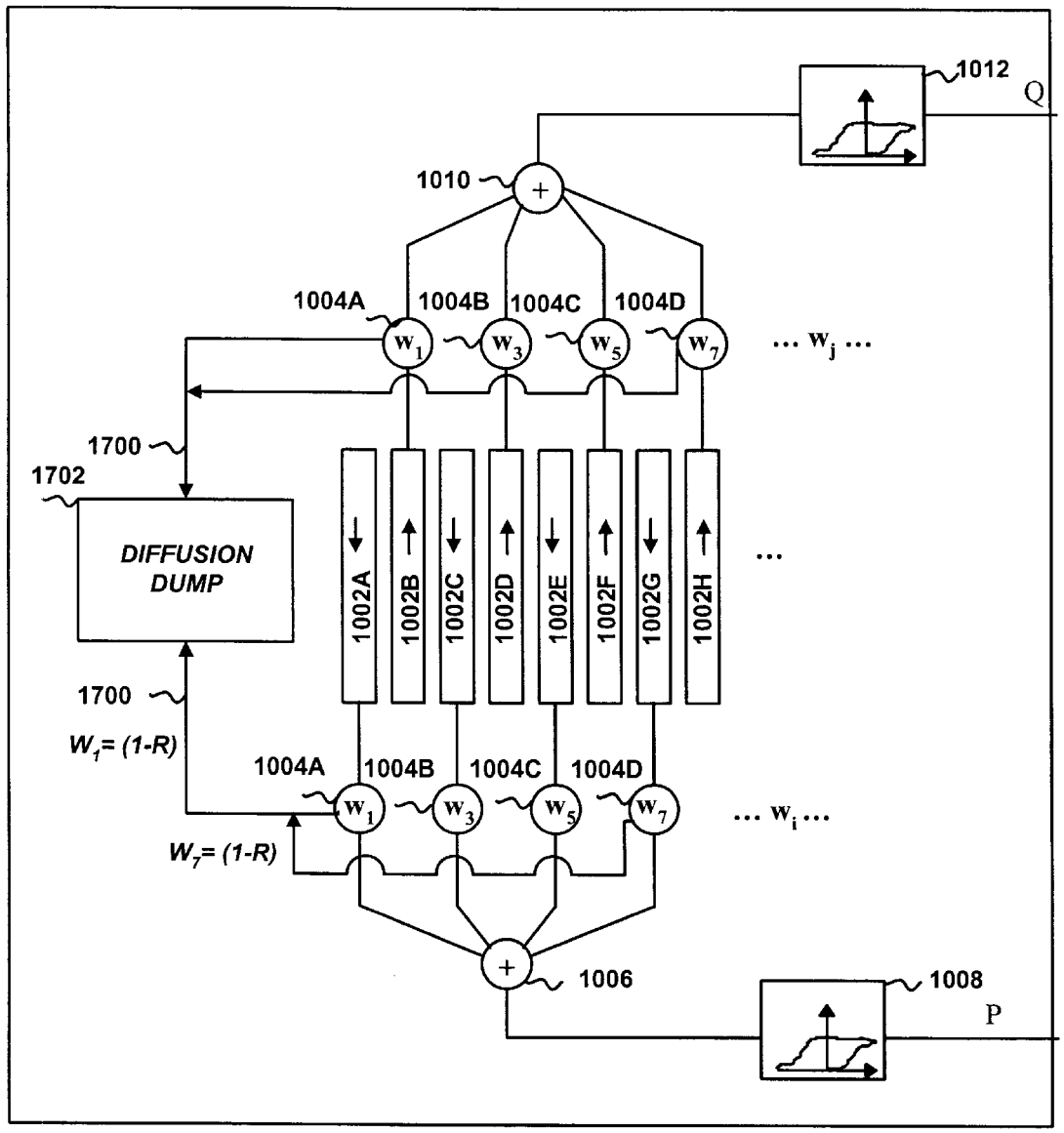
FIG. 17 is a block diagram of the sparse strip detector in FIG. 10 configured for charge "dumping" in accordance with the present invention.

Referring to FIG. 17, there is shown a block diagram of the sparse strip detector 1000 in FIG. 10 configured for charge "dumping." In the dumping technique, a fraction of the charges accumulated at the ends of the outer most strips 1002A and 1002G (P signal) and 1002B and 1002H (Q signal) are transported through an alternative path 1700 into a diffusion dump 1702, thus bypassing summing circuits 1006, 1010, respectively. The fraction of charge dumped, i.e., not measured, depends on the ratio R of the dumping time, $t_d$, over the collection time, $t_c$. The dumping time, $t_d$, is defined as the time during which a fraction of the charges on the outer strips (e.g., 1002A, 1002B, 1002G, 1002H) are effectively dumped. The collection time, $t_c$, is the time in which the charges accumulated at the ends of the inner strips (1002C, 1002E, 1002D, 1002F) are effectively integrated by summing circuits 1006, 1010. The ratio R is used to determine the weighting parameters applied to the outer strips $W_1$ and $W_7$ as follows: $W_1=(1-R)$ and $W_7=(1-R)$.

Figure 18:
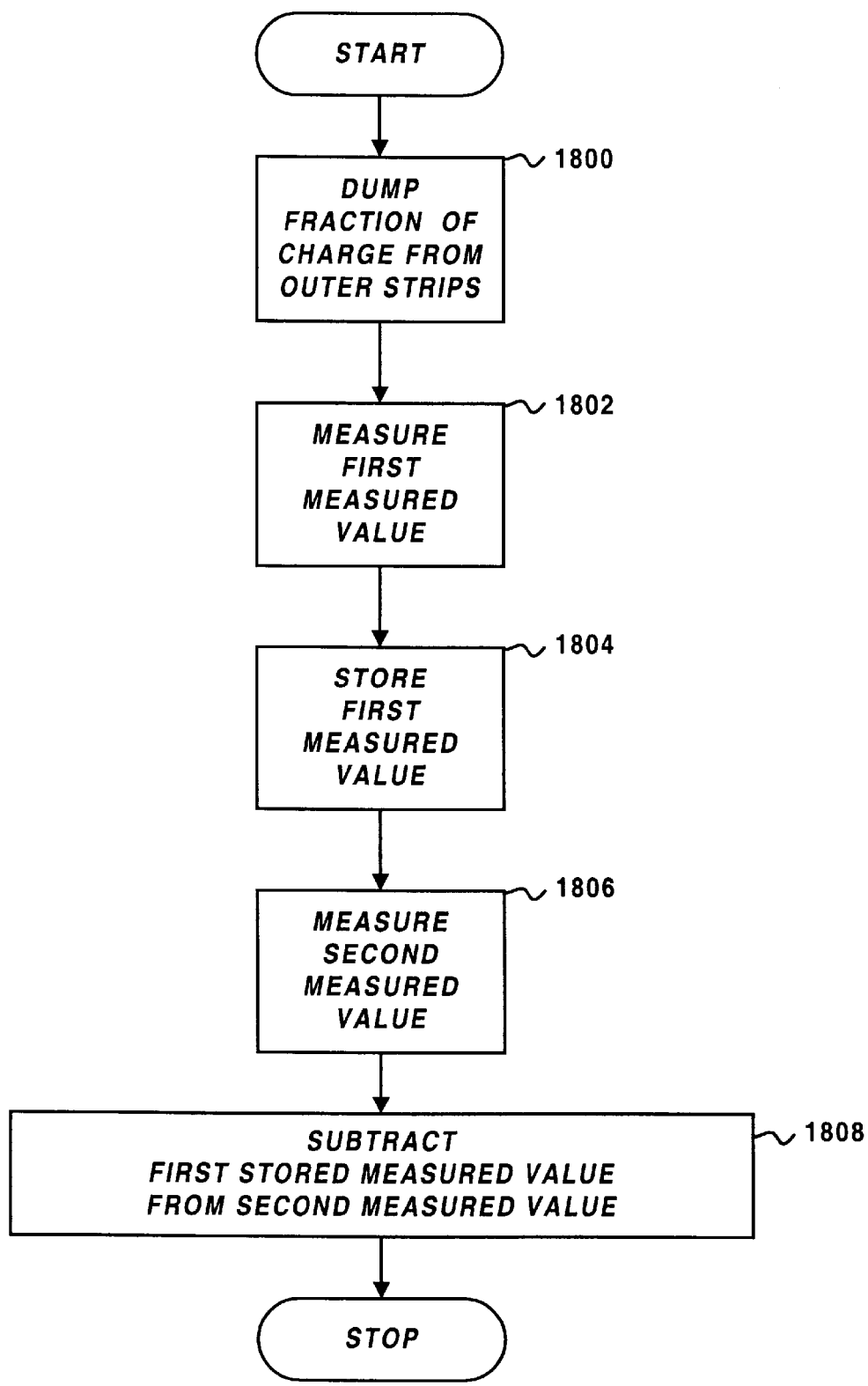
FIG. 18 is flow diagram of a procedure for generating band-limited quasi-sinusoidal signals in accordance with the present invention.

Referring to FIG. 18, there is shown a flow diagram of a procedure for generating band-limited quasi-sinusoidal signals in accordance with a preferred embodiment of the present invention. The procedure described below is used to generate both in-phase signals P and quadrature signals Q.

The procedure begins by first dumping 1800 a fraction of the collection time and thus a fraction of charge accumulated on the ends of outer strips 1002A, 1002G (P signal) and 1002B, 1002H (Q signal). Next, sign flipping between weighting parameter pairs $W_1$, $W_5$, and $W_3$, $W_7$ (See TABLE I) is achieved as follows: Measure 1802 a first measured value equal to the combined charge accumulated on the ends of strips 1002C, 1002G (P signal), and 1002D, 1002H (Q signal) using, for example, a readout capacitor (not shown), then store 1804 the first measured value in, for example, a storage capacitor (not shown). Next, measure 1806 a second measured value equal to the combined charges accumulated at the ends of strips 1002A, 1002E (P signal), and 1002B, 1002F (Q signal). Having computed the first and second measured values, electronically subtract 1808 the first stored measured value from the second measured value to cancel the voltage offsets which are common to both the first and the second measured values.

The advantage of the procedure described above, is that a common readout capacitor and integrating amplifier can be used sequentially for strips 1002C and 1002G, and then again for strips 1002A and 1002E (P signal), thus providing near perfect gain matching and near perfect offset cancellation, while reducing the need for additional hardware. Because the signals were weighted before being subtracted, the resulting band-limited quasi-sinusoidal signals are substantially free from any effects due to non-uniform surface reflectance and/or illumination, thus allowing for zero crossing detection, even at low light levels.

From the foregoing, it will be appreciated that a new and novel design has been disclosed for an optical pointing device having no mechanical moving parts but still capable of operation on a surface having suitable diffuse scattering of a light source. Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of generating band-limited quasi-sinusoidal signals, comprising the steps of:

illuminating an object with light;

focusing the light reflected from the object onto a detector to form an image, the detector having a plurality of detector elements for generating output signals in response to the image being detected, wherein a size of said image is optically matched to the detector element size;

filtering the output signals to attenuate spatial frequencies outside a predetermined spatial frequency band; and combining the output signals to provide band-limited quasi-sinusoidal signals.

2. The method of claim 1, wherein the filtering step includes the steps of:

weighting a first set of output signals generated by a first set of detector elements with a first set of weighting parameters to provide a first set of weighted output signals;

combining the first set of weighted output signals to generate an in-phase signal, wherein the in-phase signal is a band-limited quasi-sinusoidal signal;

weighting a second set of output signals generated by a second set of detector elements with a second set of weighting parameters to provide a second set of weighted output signals; and combining the second set of weighted output signals to generate a quadrature signal, wherein the quadrature signal is a band-limited quasi-sinusoidal signal.

3. The method of claim 2, wherein the output signals are weighted by dumping accumulated photocharge from at least one detector element in the first and second sets of detector elements.

4. The system of claim 3, wherein the photocharge dumped depends on the ratio R of the dumping time over the collection time.

5. A system for generating band-limited quasi-sinusoidal signals, comprising:

a light source for transmitting light toward a surface of an object that reflects light;

an aperture having an opening for receiving the reflected light;

a lens for focusing the reflected light to form an image; and a detector, optically matched with the aperture and the lens, for receiving the image, the detector having a plurality of detector elements for detecting the image and generating output signals in response to the detection of the image, the output signals weighted to attenuate spatial frequencies outside a predetermined spatial frequency band, the weighted output signals combined to form quasi-sinusoidal signals.

6. The system of claim 5, wherein the detector is a sparse strip detector, comprising:

a plurality of strip detector elements, each strip detector element having at least one end for accumulating charge in response to detecting the image;

a plurality of weighting parameters having values, each weighting parameter coupled to the end of at least one strip detector element where charge is accumulated, the values of the weighting parameters for determining a first and a second portion of the accumulated charge;

a summing circuit coupled to at least two of the weighting parameters for summing first portions of charges accumulated at the ends of at least two strip detector elements; and a diffusion dump coupled to at least one weighting parameter for receiving the second portion of charge accumulated at the end of at least one strip detector element.

7. The system of claim 5, further including:
a measurement circuit for receiving the quasi-sinusoidal signals and determining the displacement and direction of a cursor on a video display.

8. The system of claim 5, wherein the detector elements are charge-coupled-devices.

9. The system of claim 5, wherein the detector elements are bucket-brigade-devices.

10. The system of claim 6, wherein opposite ends of a first pair of strip detector elements are coupled to a first weighting parameter, opposite ends of a second pair of strip detector elements are coupled to a second weighting parameter, opposite ends of a third pair of strip detector elements are coupled to a third weighting parameter, opposite ends of a fourth pair of strip detector elements are coupled to a fourth weighting parameter.

11. The system of claim 6, wherein the weighting parameters are selected to exhibit a band-pass behavior in the spatial frequency domain.

* * * * *